US008116486B2

(12) United States Patent
Schnell et al.

(10) Patent No.: US 8,116,486 B2
(45) Date of Patent: Feb. 14, 2012

(54) MIXING OF INPUT DATA STREAMS AND GENERATION OF AN OUTPUT DATA STREAM THEREFROM

(75) Inventors: Markus Schnell, Erlangen (DE); Manfred Lutzky, Nuremberg (DE); Markus Multrus, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 525 days.

(21) Appl. No.: 12/398,013

(22) Filed: Mar. 4, 2009

(65) Prior Publication Data

US 2009/0226010 A1 Sep. 10, 2009

Related U.S. Application Data

(60) Provisional application No. 61/033,590, filed on Mar. 4, 2008.

(51) Int. Cl.
*H04B 1/00* (2006.01)

(52) U.S. Cl. ........................................ 381/119; 704/236

(58) Field of Classification Search .................. 381/119; 704/236

See application file for complete search history.

(56) References Cited

U.S. PATENT DOCUMENTS

| | | | | |
|---|---|---|---|---|
| 5,463,424 | A | 10/1995 | Dressler | |
| 2005/0102137 | A1 | 5/2005 | Zinser et al. | |
| 2006/0173691 | A1 | 8/2006 | Mukaide | |
| 2008/0097764 | A1 | 4/2008 | Grill et al. | |
| 2009/0012785 | A1 * | 1/2009 | Chengalvarayan | 704/231 |

FOREIGN PATENT DOCUMENTS

| | | |
|---|---|---|
| EP | 1377123 | 1/2004 |
| EP | 1713061 | 10/2006 |
| WO | 2005/078707 | 8/2005 |

OTHER PUBLICATIONS

Yeongha Choi et al.: "A new digital surround processing system for general A/V sources" IEEE transactions on consumer electronics, IEEE Service Center, New York, NY, US, vol. 41, No. 4 Nov. 1, 1995, pp. 1174-1180, XP000553496 ISSN: 0098-3063, paragraph (000B)-paragraph (000C); figure 3.

International Search Report for parallel application PCT/EP2009/001534, ISR mailed on Feb. 9, 2010, 17 pages.

Tobias Friedrich, et al, "Spectral Band Replication Tool for very low delay Audio COding Applications", IEEE Workshop on Applicaions of Signal Processing to Audio and Acoustics, Oct. 21, 24, New Platz, NY, pp. 199 to 202.

Per Ekstrand, "Bandwidth Extension of Audio Signals by Spectral Band Replication", IEEE Benelux Workshop of Model based Processing and Coding of Audio (MPCA-2002), Leuven Belgium, Nov. 15, 2002, pp. 53 to 58.

Technical Specification "Universal Mobile Telecommunication Systems (UTMS), . . . " ETSI TS 126 404, Sep. 2004.

* cited by examiner

*Primary Examiner* — Douglas Menz

(74) *Attorney, Agent, or Firm* — Glenn Patent Group; Michael A. Glenn

(57) ABSTRACT

An apparatus for mixing a plurality of input data streams is described, which has a processing unit adapted to compare the frames of the plurality of input data streams, and determine, based on the comparison, for a spectral component of an output frame of an output data stream, exactly one input data stream of the plurality of input data streams. The output data stream is generated by copying at least a part of an information of a corresponding spectral component of the frame of the determined data stream. Further or alternatively, the control values of the frames of the first and second input data streams are compared, and, if so, the control value is adopted.

27 Claims, 13 Drawing Sheets

MIXING OF INPUT DATA STREAMS AND GENERATION OF AN OUTPUT DATA STREAM THEREFROM

CROSS-REFERENCE TO RELATED APPLICATIONS

This application claims priority from U.S. Patent Application No. 61/033,590, which was filed on Mar. 4, 2008, and is incorporated herein in its entirety by reference.

BACKGROUND OF THE INVENTION

Embodiments according to the present invention relate to mixing a plurality of input data streams to obtain an output data stream and generating an output data stream by mixing first and second input data streams, respectively. The output data stream may, for instance, be used in the field of conferencing systems including video conferencing systems and teleconferencing systems.

In many applications more than one audio signal is to be processed in such a way that from the number of audio signals, one signal, or at least a reduced number of signals is to be generated, which is often referred to as "mixing". The process of mixing of audio signals, hence, may be referred to as bundling several individual audio signals into a resulting signal. This process is used for instance when creating pieces of music for a compact disc ("dubbing"). In this case, different audio signals of different instruments along with one or more audio signals comprising vocal performances (singing) are typically mixed into a song.

Further fields of application, in which mixing plays an important role, are video conferencing systems and teleconferencing systems. Such a system is typically capable of connecting several spatially distributed participants in a conference by employing a central server, which appropriately mixes the incoming video and audio data of the registered participants and sends to each of the participants a resulting signal in return. This resulting signal or output signal comprises the audio signals of all the other conference participants.

In modern digital conferencing systems a number of partially contradicting goals and aspects compete with each other. The quality of a reconstructed audio signal, as well as applicability and usefulness of some coding and decoding techniques for different types of audio signals (e.g. speech signals compared to general audio signals and musical signals), have to be taken into consideration. Further aspects that may have to be considered also when designing and implementing conferencing systems are the available bandwidth and delay issues.

For instance, when balancing quality on the one hand and bandwidth on the other hand, a compromise is in most cases inevitable. However, improvements concerning the quality may be achieved by implementing modern coding and decoding techniques such as the AAC-ELD technique (AAC=Advanced Audio Codec; ELD=Enhanced Low Delay). However, the achievable quality may be negatively affected in systems employing such modern techniques by more fundamental problems and aspects.

To name just one challenge to be met, all digital signal transmissions face the problem of a necessitated quantization, which may, at least in principle, be avoidable under ideal circumstances in a noiseless analog system. Due to the quantization process inevitably a certain amount of quantization noise is introduced into the signal to be processed. To counteract possible and audible distortions, one might be tempted to increase the number of quantization levels and, hence, increase the quantization resolution accordingly. This, however, leads to a greater number of signal values to be transmitted and, hence, to an increase of the amount of data to be transmitted. In other words, improving the quality by reducing possible distortions introduced by quantization noise might under certain circumstances increase the amount of data to be transmitted and may eventually violate bandwidth restrictions imposed on a transmission system.

In the case of conferencing systems, the challenges of improving a trade-off between quality, available bandwidth and other parameters may be even further complicated by the fact that typically more than one input audio signal is to be processed. Hence, boundary conditions imposed by more than one audio signal may have to be taken into consideration when generating the output signal or resulting signal produced by the conferencing system.

Especially in view of the additional challenge of implementing conferencing systems with a sufficiently low delay to enable a direct communication between the participants of a conference without introducing substantial delays which may be considered unacceptable by the participants, further increases the challenge.

In low delay implementations of conferencing systems, sources of delay are typically restricted in terms of their number, which on the other hand might lead to the challenge of processing the data outside the time-domain, in which mixing of the audio signals may be achieved by superimposing or adding the respective signals.

Generally speaking it is favorable to choose a trade-off between quality, available bandwidth and other parameters suitable for conferencing systems carefully in order to cope with the processing overhead for mixing in real time, lower the hardware amount needed, and keep the costs in terms of hardware and transmission overhead reasonable without compromising the audio quality.

To reduce an amount of data transmitted, modern audio codecs often utilize highly sophisticated tools to describe spectral information concerning spectral components of a respective audio signal. By utilizing such tools, which are based on psycho-acoustic phenomena and examination results, an improved trade-off between partially contradicting parameters and boundary conditions such as the quality of the reconstructed audio signal from the transmitted data, computational complexity, bitrate, and further parameters can be achieved.

Examples for such tools are for example perceptual noise substitution (PNS), temporal noise shaping (TNS), and spectral band replication (SBR), to name but a few. All these techniques are based on describing at least part of spectral information with a reduced number of bits so that, compared to a data stream based on not using these tools, more bits can be allocated to spectrally important parts of the spectrum. As a consequence, while maintaining the bitrate, a perceptible level of quality may be improved by using such tools. Naturally, a different trade-off may be selected, namely to reduce the number of bits transmitted per frame of audio data maintaining the overall audio impression. Different trade-offs lying in between these two extreme may also be equally well realized.

These tools may also be used in telecommunication applications. However, when more than two participants in such a communications situation are present, it may be very advantageous to employ a conferencing system for mixing two or more bit streams of more than two participants. Situations like these occur in both, purely audio-based or teleconferencing situations, as well as video conferencing situations.

A conferencing system operating in a frequency domain is, for instance, described in US 2008/0097764 A1 which performs the actual mixing in the frequency domain and, thereby, omitting retransforming the incoming audio signals back into the time-domain.

However, the conferencing system described therein does not take into account the possibilities of tools as described above, which enable a description of spectral information of at least one spectral component in a more condensed manner. As a result, such a conferencing system necessitates additional transformation steps to reconstruct the audio signals provided to the conferencing system at least to such a degree that the respective audio signals are present in the frequency domain. Moreover, the resulting mixed audio signal also needs to be retransformed based on the additional tools mentioned above. These retransformation and transformation steps require, however, an application of complex algorithms, which may lead to an increased computational complexity and, for instance, in the case of portable, energetically critical applications, to an increased energy consumption and, hence, to a limited operational time.

SUMMARY

According to an embodiment, an apparatus for mixing a plurality of input data streams, wherein the input data streams each have a frame of audio data in a spectral domain, a frame of an input data stream having spectral information for a plurality of spectral components, may have a processing unit adapted to compare the frames of the plurality of input data streams, wherein the processing unit is further adapted to determine, based on the comparison, for a spectral component of an output frame of an output data stream, exactly one input data stream of the plurality of input data streams; and wherein the processing unit is further adapted to generate the output data stream by copying at least a part of information of a corresponding spectral component of the frame of the determined input data stream to describe the spectral component of the output frame of the output data stream.

According to another embodiment, a method for mixing a plurality of input data streams, wherein the input data streams each have a frame of audio data in a spectral domain, a frame of an input data stream having a plurality of spectral components, may have the steps of comparing the frames of the plurality of input data streams; determining, based on the comparison, for a spectral component of an output frame of an output data stream exactly one input data stream of the plurality of input data streams; and generating the output data stream by copying at least a part of a piece of information of a corresponding spectral component of the frame of the determined input data stream to describe the spectral component of the frame of the output data stream.

According to another embodiment, a computer program for performing, when running on a processor, may perform a method for mixing a plurality of input data streams, wherein the input data streams each have a frame of audio data in a spectral domain, a frame of an input data stream having a plurality of spectral components, with the steps of comparing the frames of the plurality of input data streams; determining, based on the comparison, for a spectral component of an output frame of an output data stream exactly one input data stream of the plurality of input data streams; and generating the output data stream by copying at least a part of a piece of information of a corresponding spectral component of the frame of the determined input data stream to describe the spectral component of the frame of the output data stream.

According to another embodiment, an apparatus for generating an output data stream from a first input data stream and a second input data stream, wherein the first and second input data streams each have a frame, wherein the frames each have a control value and associated payload data, the control value indicating a way the payload data represents at least a part of a spectral domain of an audio signal, may have a processor unit adapted to compare the control value of the frame of the first input data stream and the control value of the frame of the second input data stream to yield a comparison result, wherein the processor unit is further adapted to, if the comparison result indicates that the control values of the frames of the first and second input data streams are identical, generate the output data stream having an output frame such that the output frame has a control value equal to that of the frame of the first and second input data streams and payload data derived from the payload data of the frames of the first and second input data streams by processing the audio data in the spectral domain.

According to another embodiment, a method for generating an output data stream from a first input data stream and a second input data stream, wherein the first and second input data streams each have a frame, wherein the frame has the control value and associated payload data, the control value indicating a way the payload data represents at least a part of a spectral domain of an audio signal, may have the steps of comparing the control value of the frame of the first input data stream and the control value of the frame of the second input data stream to yield a comparison result; and if the comparison result indicates that the control values of the frames of the first and second input data streams are identical, generating the output data stream having an output frame, such that the output frame has a control value equal to that of the frame of the first and second input data streams and payload data derived from the payload data of the frames of the first and second input data streams by processing the audio data in the spectral domain.

According to another embodiment, a program for performing, when running on a processor, may execute a method for generating an output data stream from a first input data stream and a second input data stream, wherein the first and second input data streams each have a frame, wherein the frame has the control value and associated payload data, the control value indicating a way the payload data represents at least a part of a spectral domain of an audio signal, having the steps of comparing the control value of the frame of the first input data stream and the control value of the frame of the second input data stream to yield a comparison result; and if the comparison result indicates that the control values of the frames of the first and second input data streams are identical, generating the output data stream having an output frame, such that the output frame has a control value equal to that of the frame of the first and second input data streams and payload data derived from the payload data of the frames of the first and second input data streams by processing the audio data in the spectral domain.

According to a first aspect, embodiments according to the present invention are based on the finding that, when mixing a plurality of input data streams, an improved trade-off between the above-mentioned parameters and goals is achievable, by determining an input data stream based on a comparison and to copy at least partially spectral information from the determined input data stream to the output data stream. By copying spectral information at least partially from one input data stream, a requantization may be omitted and, hence, requantization noise associated therewith. In case of spectral information for which no dominating input stream is determinable, mixing the corresponding spectral information in the frequency domain may be performed by an embodiment according to the present invention.

The comparison may, for instance, be based on a psycho-acoustic model. The comparison may further relate to spectral information corresponding to a common spectral component (e.g. a frequency or a frequency band) from at least two different input data streams. It may, therefore, be an inter-channel-comparison. In case the comparison is based on a psycho-acoustic model, the comparison may, hence, be described as considering an inter-channel-masking.

According to a second aspect, embodiments according to the present invention are based on the finding that a complexity of operations carried out during mixing a first input data stream and a second input data stream to generate an output data stream may be reduced by taking into account control values associated with payload data of the respective input data stream, wherein the control values indicate a way the payload data represents at least a part of the corresponding spectral information or spectral domain of the respective audio signals. In case control values of the two input data streams are equal, a new decision on the way the spectral domain at the respective frame of the output data stream may be omitted and instead the output stream generation may rely on the decision already and concordantly determined by the encoders of the input data streams, i.e. adopt the control value therefrom. Depending on the way indicated by the control values, it may even be possible and advantageous to avoid retransforming the respective payload data back into another way of representing the spectral domain such as the normal or plain way with one spectral value per time/spectral sample. In the latter case, a direct processing of the payload data to yield the corresponding payload data of the output data stream and the control value being equal to the control values of the first and second input data streams may be generated with the "directivity" meaning "without changing the way the spectral domain is represented" such as by means of PNS or similar audio features described in more detail below.

In embodiments according to an embodiment of the present invention, the control values relate to at least one spectral component only. Moreover, in embodiments according to the present invention such operations may be carried out when frames of the first input data stream and the second input data stream correspond to common time index with respect to an appropriate sequence of frames of the two input data streams.

In case the control values of the first and second data streams are not equal, embodiments according to the present invention may perform the step of transforming the payload data of one frame of one of the first and second input data streams to obtain a representation of the payload data of a frame of the other input data stream. The payload data of the output data stream may then be generated based on the transform payload data and the payload data of the other two streams. In some cases, embodiments according to the present invention transforming the payload data of the frame of the one input data stream to the representation of the payload data of the frame of the other input data stream may be directly performed without transforming the respective audio signal back into the plain frequency domain.

BRIEF DESCRIPTION OF THE DRAWINGS

Embodiments of the present invention will be detailed subsequently referring to the appended drawings, in which.

DETAILED DESCRIPTION OF THE INVENTION

With respect to FIGS. 4 to 12C, different embodiments according to the present invention will be described in more detail. However, before describing these embodiments in more detail, first with respect to FIGS. 1 to 3, a brief introduction will be given in view of the challenges and demands which may become important in the framework of conferencing systems.

Figure 1:
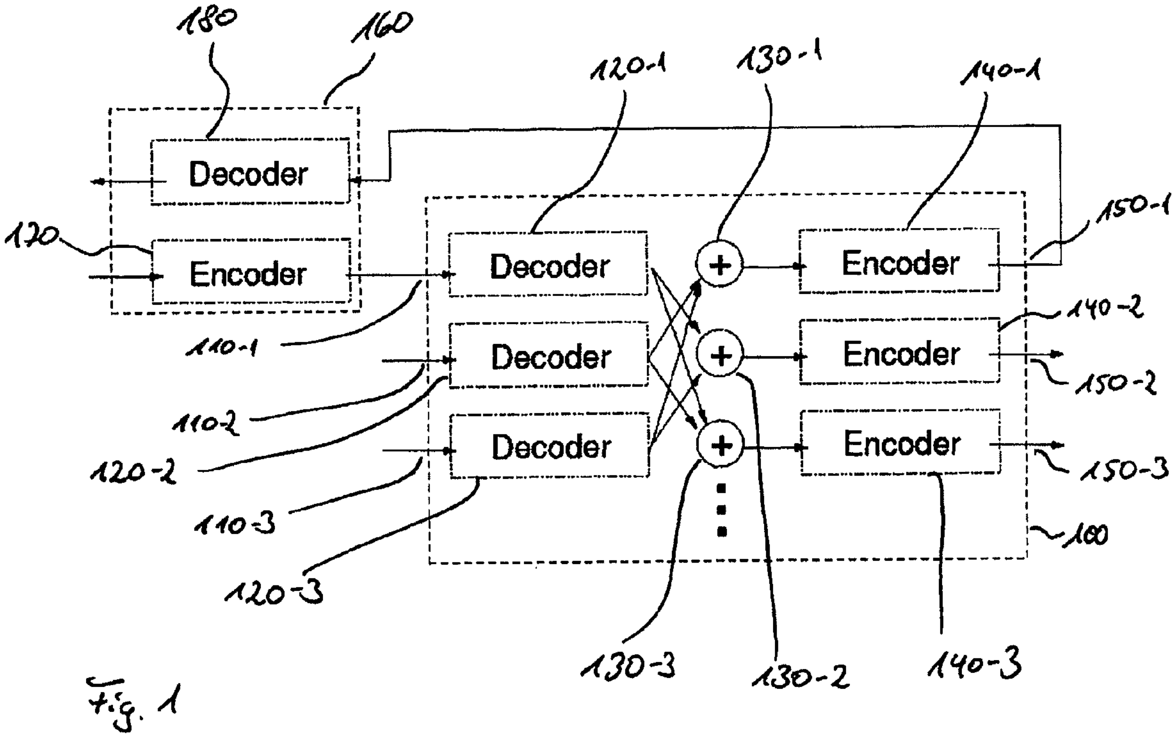
FIG. 1 shows a block diagram of a conferencing system.

FIG. 1 shows a block diagram of a conferencing system 100, which may also be referred to as a multi-point control unit (MCU). As will become apparent from the description concerning its functionality, the conferencing system 100, as shown in FIG. 1, is a system operating in the time domain.

The conferencing system 100, as shown in FIG. 1, is adapted to receive a plurality of input data streams via an appropriate number of inputs 110-1, 110-2, 110-3, . . . of which in FIG. 1 only three are shown. Each of the inputs 110 is coupled to a respective decoder 120. To be more precise, input 110-1 for the first input data stream is coupled to a first decoder 120-1, while the second input 110-2 is coupled to a second decoder 120-2, and the third input 110-3 is coupled to a third decoder 120-3.

The conferencing system 100 further comprises an appropriate number of adders 130-1, 130-2, 130-3, . . . of which once again three are shown in FIG. 1. Each of the adders is associated with one of the inputs 110 of the conferencing system 100. For instance, the first adder 130-1 is associated with the first input 110-1 and the corresponding decoder 120-1.

Each of the adders 130 is coupled to the outputs of all the decoders 120, apart from the decoder 120 to which the input 110 is coupled. In other words, the first adder 130-1 is coupled to all the decoders 120, apart from the first decoder 120-1. Accordingly, the second adder 130-2 is coupled to all the decoders 120, apart from the second decoder 120-2.

Each of the adders 130 further comprises an output which is coupled to one encoder 140, each. Hence, the first adder 130-1 is coupled output-wise to the first encoder 140-1. Accordingly, the second and third adders 130-2, 130-3 are also coupled to the second and third encoders 140-2, 140-3, respectively.

In turn, each of the encoders 140 is coupled to the respective output 150. In other words, the first encoder is, for instance, coupled to a first output 150-1. The second and third encoders 140-2, 140-3 are also coupled to second and third outputs 150-2, 150-3, respectively.

To be able to describe the operation of a conferencing system 100 as shown in FIG. 1 in more detail, FIG. 1 also shows a conferencing terminal 160 of a first participant. The conferencing terminal 160 may, for instance, be a digital telephone (e.g. an ISDN-telephone (ISDN=integrated service digital network)), a system comprising a voice-over-IP-infrastructure, or a similar terminal.

The conferencing terminal 160 comprises an encoder 170 which is coupled to the first input 110-1 of the conferencing system 100. The conferencing terminal 160 also comprises a decoder 180 which is coupled to the first output 150-1 of the conferencing system 100.

Similar conferencing terminals 160 may also be present at the sites of further participants. These conferencing terminals are not shown in FIG. 1, merely for the sake of simplicity. It should also be noted that the conferencing system 100 and the conferencing terminals 160 do by far not need to be physically present in the closer vicinity of each other. The conferencing terminals 160 and the conferencing system 100 may be arranged at different sites, which may, for instance, be connected only by means of WAN-techniques (WAN=wide area networks).

The conferencing terminals 160 may further comprise or be connected to additional components such as microphones, amplifiers and loudspeakers or headphones to enable an exchange of audio signals with a human user in a more comprehensible manner. These are not shown in FIG. 1 for the sake of simplicity only.

As indicated earlier, the conferencing system 100 shown in FIG. 1 is a system operating in the time domain. When, for example, the first participant talks into the microphone (not shown in FIG. 1), the encoder 170 of the conferencing terminal 160 encodes the respective audio signal into a corresponding bit stream and transmits the bit stream to the first input 110-1 of the conferencing system 100.

Inside the conferencing system 100, the bit stream is decoded by the first decoder 120-1 and transformed back into the time domain. Since the first decoder 120-1 is coupled to the second and third mixers 130-1, 130-3, the audio signal, as generated by the first participant may be mixed in the time domain by simply adding the reconstructed audio signal with further reconstructed audio signals from the second and third participant, respectively.

This is also true for the audio signals provided by the second and third participant received by the second and third inputs 110-2, 110-3 and processed by the second and third decoders 120-2, 120-3, respectively. These reconstructed audio signals of the second and third participants are then provided to the first mixer 130-1, which in turn, provides the added audio signal in the time domain to the first encoder 140-1. The encoder 140-1 re-encodes the added audio signal to form a bit stream and provides same at the first output 150-1 to the first participants conferencing terminal 160.

Similarly, also the second and third encoders 140-2, 140-3 encode the added audio signals in the time domain received from the second and third adders 130-2, 130-3, respectively, and transmit the encoded data back to the respective participants via the second and third outputs 150-2, 150-3, respectively.

To perform the actual mixing, the audio signals are completely decoded and added in a non-compressed form. Afterwards, optionally a level adjustment may be performed by compressing the respective output signals to prevent clipping effects (i.e. overshooting an allowable range of values). Clipping may appear when single sample values rise above or fall below an allowed range of values so that the corresponding values are cut off (clipped). In the case of a 16-bit quantization, as it is for instance employed in the case of CDs, a range of integer values between −32768 and 32767 per sample value are available.

To counteract a possible over or under steering of the signal, compression algorithms are employed. These algorithms limit the development over or below a certain threshold value to maintain the sample values within an allowable range of values.

When coding audio data in conferencing systems such as conferencing system 100, as shown in FIG. 1, some drawbacks are accepted in order to perform a mixing in the unencoded state in a most easily achievable manner. Moreover, the data rates of the encoded audio signals are additionally limited to a smaller range of transmitted frequencies, since a smaller bandwidth allows a lower sampling frequency and, hence, less data, according to the Nyquist-Shannon-Sampling theorem. The Nyquist-Shannon-Sampling theorem states that the sampling frequency depends on the bandwidth of the sampled signal and needs to be (at least) twice as large as the bandwidth.

The International Telecommunication Union (ITU) and its telecommunication standardization sector (ITU-T) have developed several standards for multimedia conferencing systems. The H.320 is the standard conferencing protocol for ISDN. H.323 defines the standard conferencing system for a packet-based network (TCP/IP). The H.324 defines conference systems for analog telephone networks and radio telecommunication systems.

Within these standards, not only transmitting the signals, but also encoding and processing of the audio data is defined. The management of a conference is taken care of by one or more servers, the so-called multi-point control units (MCU) according to standard H.231. The multi-point control units are also responsible for the processing and distribution of video and audio data of the several participants.

To achieve this, the multi-point control unit sends to each participant a mixed output or resulting signal comprising the audio data of all the other participants and provides the signal to the respective participants. FIG. 1 not only shows a block diagram of a conferencing system 100, but also a signal flow in such a conferencing situation.

In the framework of the H.323 and H.320 standards, audio codecs of the class G.7xx are defined for operation in the respective conferencing systems. The standard G.711 is used for ISDN-transmissions in cable-bound telephone systems. At a sampling frequency of 8 kHz, the G.711 standard covers an audio bandwidth between 300 and 3400 Hz, requiring a bitrate of 64 kbit/s at a (quantization) depth of 8-bits. The coding is formed by a simple logarithmic coding called μ-Law or A-Law which creates a very low delay of only 0.125 ms.

The G.722 standard encodes a larger audio bandwidth from 50 to 7000 Hz at a sampling frequency of 16 kHz. As a consequence, the codec achieves a better quality when compared to the more narrow-banded G.7xx audio codecs at bitrates of 48, 56, or 64 Kbit/s, at a delay of 1.5 ms. Moreover, two further developments, the G.722.1 and G.722.2 exist, which provide comparable speech quality at even lower bitrates. The G722.2 allows a choice of bitrate between 6.6 kbit/s and 23.85 kbit/s at a delay of 25 ms.

The G.729 standard is typically employed in the case of IP-telephone communication, which is also referred to as voice-over-IP communications (VoIP). The codec is optimized for speech and transmits an set of analyzed speech parameters for a later synthesis along with an error signal. As a result, the G.729 achieves a significantly better coding of approximately 8 kbit/s at a comparable sample rate and audio bandwidth, when compared to the G.711 standard. The more complex algorithm, however, creates a delay of approximately 15 ms.

As a drawback, the G.7.xx codecs are optimized for speech encoding and shows, apart from a narrow frequency bandwidth, significant problems when coding music along with speech, or pure music.

Hence, although the conferencing system 100, as shown in FIG. 1, may be used for an acceptable quality when transmitting and processing speech signals, general audio signals are not satisfactorily processed when employing low-delay codecs optimized for speech.

In other words, employing codecs for coding and decoding of speech signals to process general audio signals, including for instance audio signals with music, does not lead to a satisfying result in terms of the quality. By employing audio codecs for encoding and decoding general audio signals in the framework of the conferencing system 100, as shown in FIG. 1, the quality is improvable. However, as will be outlined in the context with FIG. 2 in more detail, employing general audio codecs in such a conferencing system may lead to further, unwanted effects, such as an increased delay to name but one.

Figure 2:
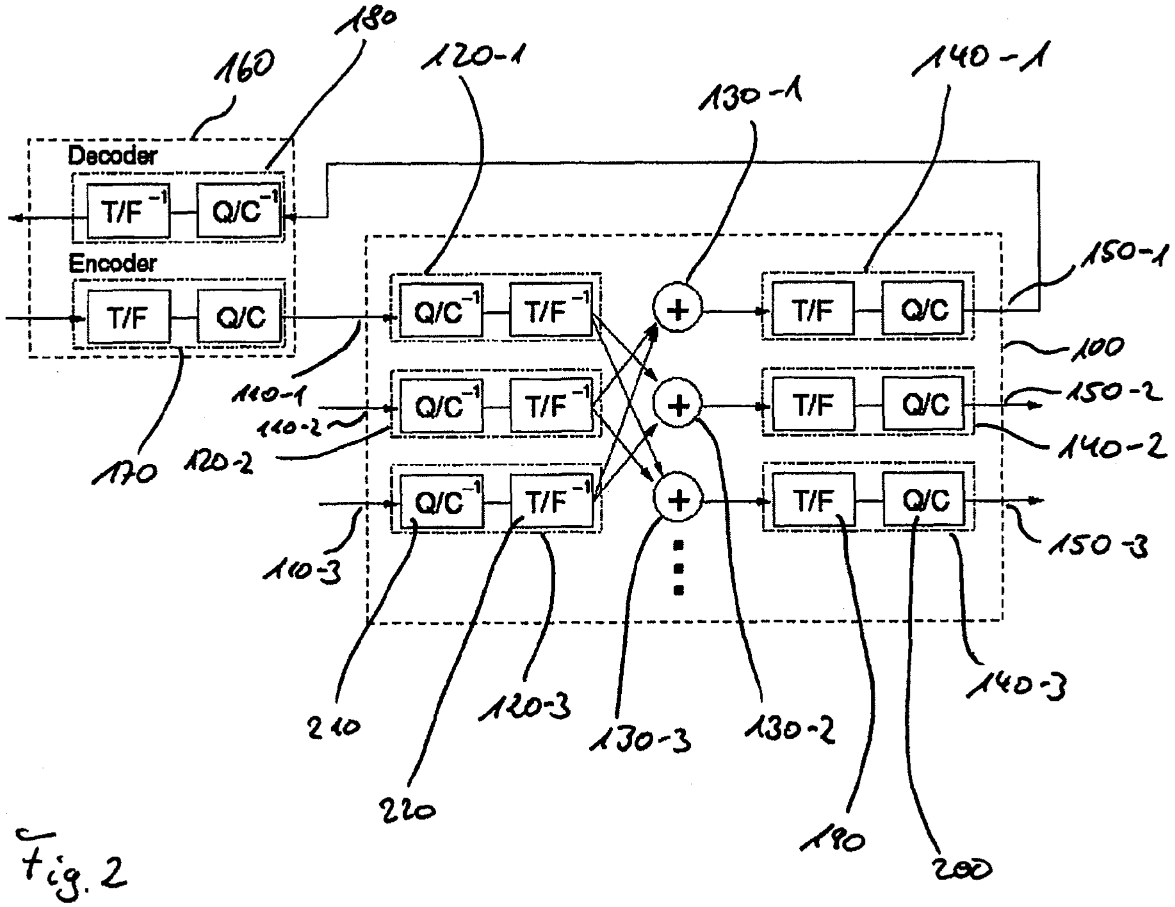
FIG. 2 shows a block diagram of the conferencing system based on a general audio codec.

However, before describing FIG. 2 in more detail, it should be noted that in the present description, objects are denoted with the same or similar reference signs when the respective objects appear more than once in an embodiment or a figure, or appear in several embodiments or figures. Unless explicitly or implicitly denoted otherwise, objects denoted by the same or similar reference signs may be implemented in a similar or equal manner, for instance, in terms of their circuitry, programming, features, or other parameters. Hence, objects appearing in several embodiments of figures and being denoted with the same or similar reference signs may be implemented having the same specifications, parameters, and features. Naturally, also deviations and adaptations may be implemented, for instance, when boundary conditions or other parameters change from figure to figure, or from embodiment to embodiment.

Moreover, in the following summarizing reference signs will be used to denote a group or class of objects, rather than an individual object. In the framework of FIG. 1, this has already been done, for instance when denoting the first input as input 110-1, the second input as input 110-2, and the third input as input 110-3, while the inputs have been discussed in terms of the summarizing reference sign 110 only. In other words, unless explicitly noted otherwise, parts of the description referring to objects denoted with summarizing reference signs may also relate to other objects bearing the corresponding individual reference signs.

Since this is also true for objects denoted with the same or similar reference signs, both measures help to shorten the description and to describe the embodiments disclosed therein in a more clear and concise manner.

FIG. 2 shows a block diagram of a further conferencing system 100 along with a conferencing terminal 160, which are both similar to these shown in FIG. 1. The conferencing system 100 shown in FIG. 2 also comprises inputs 110, decoders 120, adders 130, encoders 140, and outputs 150, which are equally interconnected as compared to the conferencing system 100 shown in FIG. 1. The conferencing terminal 160 shown in FIG. 2 also comprises again an encoder 170 and a decoder 180. Therefore, reference is made to the description of the conferencing system 100 shown in FIG. 1.

However, conferencing system 100 shown in FIG. 2, as well as the conferencing terminal 160 shown in FIG. 2 are adapted to use a general audio codec (COder-DECoder). As a consequence, each of the encoders 140, 170, comprise a series connection of a time/frequency converter 190 coupled before a quantizer/coder 200. The time/frequency converter 190 is also illustrated in FIG. 2 as "T/F", while the quantizer/coders 200 are labeled in FIG. 2 with "Q/C".

The decoders 120, 180 each comprise a decoder/dequantizer 210, which is referred to in FIG. 2 as "IQ/$C^{-1}$" connected in series with a frequency/time converter 220, which is referred to in FIG. 2 as "T/$F^{-1}$". For the sake of simplicity only, the time/frequency converter 190, the quantizer/coder 200 and the decoder/dequantizer 210, as well as the frequency/time converter 220 are labeled as such only in the case of the encoder 140-3 and the decoder 120-3. However, the following description also refers to the other such elements.

Starting with an encoder such as the encoders 140, or the encoder 170, the audio signal provided to the time/frequency converter 190 is converted from the time domain into a frequency domain or a frequency-related domain by the converter 190. Afterwards, the converted audio data are, in a spectral representation generated by the time/frequency converter 190, quantized and coded to form a bit stream, which is then provided, for instance, to the outputs 150 of the conferencing system 100 in the case of the encoder 140.

In terms of the decoders such as the decoders 120 or the decoder 180, the bit stream provided to the decoders is first decoded and re-quantized to form the spectral representation of at least a part of an audio signal, which is then converted back into the time domain by the frequency/time converters 220.

The time/frequency converters 190, as well as the inverse elements, the frequency/time converters 220 are therefore adapted to generate a spectral representation of a at least a piece of an audio signal provided thereto and to re-transform the spectral representative into the corresponding parts of the audio signal in the time domain, respectively.

In the process of converting an audio signal from the time domain into the frequency domain, and back from the frequency domain into the time domain, deviations may occur so that the re-established, reconstructed or decoded audio signal may differ from the original or source audio signal. Further artifacts may be added by the additional steps of quantizing and de-quantizing performed in the framework of the quantizer encoder 200 and the re-coder 210. In other words, the original audio signal, as well as the re-established audio signal, may differ from one another.

The time/frequency converters 190, as well as the frequency/time converters 220 may, for instance, be implemented based on a MDCT (modified discreet cosine transformation), a MDST (modified discrete sine transformation), a FFT-based converter (FFT=Fast Fourier Transformation), or another Fourier-based converter. The quantization and the re-quantization in the framework of the quantizer/coder 200 and the decoder/dequantizer 210 may for instance be implemented based on a linear quantization, a logarithmic quantization, or another more complex quantization algorithm, for example, taking more specifically the hearing characteristics of the human into account. The encoder and decoder parts of the quantizer/coder 200 and the decoder/dequantizer 210 may, for instance, work by employing a Huffman coding or Huffman decoding scheme.

However, also more complex time/frequency and frequency/time converters 190, 220, as well as more complex quantizer/coder and decoder/dequantizer 200, 210 may be employed in different embodiments and systems as described here, being part of or forming, for instance, an AAC-ELD encoder as encoders 140, 170, and a AAC-ELD-decoder as decoders 120, 180.

Needless to say that it might be advisable to implement identical, or at least compatible, encoders 170, 140 and decoders 180, 120, in the framework of the conferencing system 100 and the conferencing terminals 160.

The conferencing system 100, as shown in FIG. 2, based on a general audio signal coding and decoding scheme also performs the actual mixing of the audio signals in the time domain. The adders 130 are provided with the reconstructed audio signals in the time domain to perform a super-position and to provide the mixed signals in the time domain to the time/frequency converters 190 of the following encoders 140. Hence, the conferencing system once again comprises a series connection of decoders 120 and encoders 140, which is the reason why a conferencing system 100, as shown in FIGS. 1 and 2, are typically referred to as "tandem coding systems".

Tandem coding systems often show the drawback of a high complexity. The complexity of mixing strongly depends on the complexity of the decoders and encoders employed, and may multiply significantly in the case of several audio input and audio output signals. Moreover, due to the fact that most of the encoding and decoding schemes are not lossless, the tandem coding scheme, as employed in the conferencing systems 100 shown in FIGS. 1 and 2, typically lead to a negative influence on quality.

As a further drawback, the repeated steps of decoding and encoding also enlarges the overall delay between the inputs 110 and the outputs 150 of the conferencing system 100, which is also referred to as the end-to-end delay. Depending on an initial delay of the decoders and encoders used, the conferencing system 100 itself, may increase the delay up to a level which makes the use in the framework of the conferencing system unattractive, if not disturbing, or even impossible. Often a delay of approximately 50 ms is considered to be the maximum delay which participants may accept in conversations.

As main sources for the delay, the time/frequency converters 190, as well as the frequency/time converters 220 are responsible for the end-to-end delay of the conferencing system 100, and the additional delay imposed by the conferencing terminals 160. The delay caused by the further elements, namely the quantizers/coders 200 and the decoders/dequantizers 210 is of less importance since these components may be operated at a much higher frequency compared to the time/frequency converters and the frequency/time converters 190, 220. Most of the time/frequency converters and frequency/time converters 190, 220 are block-operated or frame-operated, which means that in many cases a minimum delay as an amount of time has to be taken into account, which is equal to the time needed to fill a buffer or a memory having the length of frame of a block. This time is, however, significantly influenced by the sampling frequency which is typically in the range of a few kHz to a few 10 kHz, while the operational speed of the quantizers/coders 200, as well as the decoder/dequantizer 210 is mainly determined by the clock frequency of the underlying system. This is typically at least 2, 3, 4, or more orders of magnitude larger.

Hence, in conferencing systems employing general audio signal codecs the so-called bit stream mixing technology has been introduced. The bit stream mixing method may, for instance, be implemented based on the MPEG-4 AAC-ELD codec, which offers the possibility of avoiding at least some of the drawbacks mentioned above and introduced by tandem coding.

It should however be noted that, in principle, the conferencing system 100 as shown in FIG. 2, may also be implemented based on the MPEG-4 AAC-ELD codec with a similar bit rate and a significantly larger frequency bandwidth, compared to the previously mentioned speech-based codes of the G.7xx codec family. This immediately also implies that a significantly better audio quality for all signal types may be achievable at the cost of a significantly increased bitrate. Although the MPEG-4 AAC-ELD offers a delay which is in the range of that of the G.7xx codec, implementing same in the framework of a conferencing system as shown in FIG. 2, may not lead to a practical conferencing system 100. In the following, with respect to FIG. 3, a more practical system based on the previously mentioned so-called bit stream mixing will be outlined.

It should be noted that for the sake of simplicity only, the focus will mainly be laid on the MPEG-4 AAC-ELD codec and its data streams and bit streams. However, also other encoders and decoders may be employed in the environment of a conferencing system 100 as illustrated and shown in FIG. 3.

Figure 3:
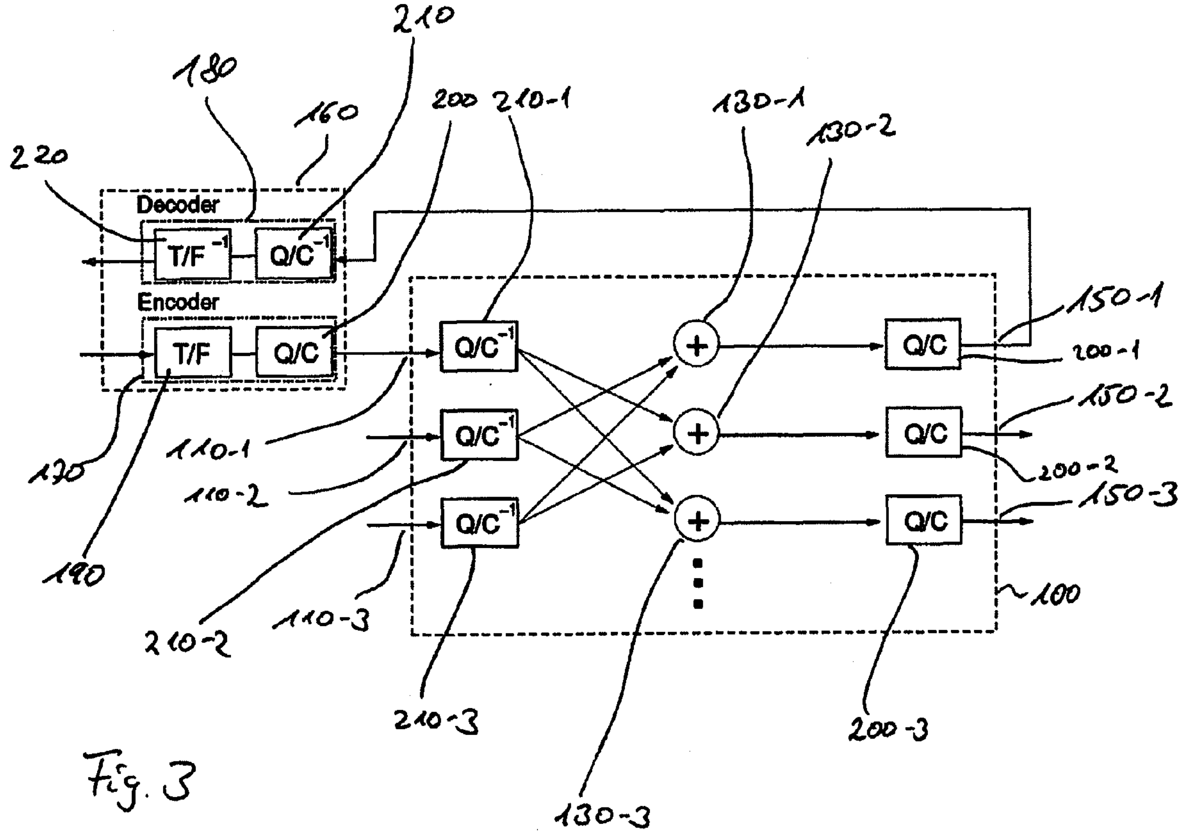
FIG. 3 shows a block diagram of a conferencing system operating in a frequency domain using the bit stream mixing technology.

FIG. 3 shows a block diagram of a conferencing system 100 working according to the principle of bit stream mixing along with a conferencing terminal 160, as described in the context of FIG. 2. The conferencing system 100 itself is a simplified version of the conferencing system 100 shown in FIG. 2. To be more precise, the decoders 120 of the conferencing system 100 in FIG. 2 have been replaced by decoders/dequantizers 220-1, 220-2, 210-3, . . . as shown in FIG. 3. In other words, the frequency/time converters 120 of the decoders 120 have been removed when comparing the conferencing system 100 shown in FIGS. 2 and 3. Similarly, the encoders 140 of the conferencing system 100 of FIG. 2 have been replaced by quantizer/coders 200-1, 200-2, 200-3. Hence, the time/frequency converters 190 of the encoders 140 have been removed when comparing the conferencing system 100 shown in FIGS. 2 and 3.

As a result, the adders 130 no longer operate in the time domain, but, due to the lack of the frequency/time converters 220 and the time/frequency converters 190, in the frequency or in a frequency-related domain.

For instance, in the case of the MPEG-4 AAC-ELD codecs, the time/frequency converter 190 and the frequency/time converter 220, which are only present in the conferencing terminals 160, are based on a MDCT-transformation. Therefore, inside the conferencing system 100, the mixers 130 directly operate at the contributions of the audio signals in the MDCT-frequency representation.

Since the converters 190, 220 represent the main source of delay in the case of the conferencing system 100 shown in FIG. 2, the delay is significantly reduced by removing these converters 190, 220. Moreover, the complexity introduced by the two converters 190, 220 inside the conferencing system 100 is also significantly reduced. For instance, in the case of a MPEG-2 AAC-decoder, the inverse MDCT-transformation carried out in the framework of the frequency/time converter 220 is responsible for approximately 20% of the overall complexity. Since also the MPEG-4 converter is based on a similar transformation, a non-irrelevant contribution to the overall complexity may be removed by removing the frequency/time converter 220 alone from the conferencing system 100.

Mixing audio signals in the MDCT-domain, or another frequency-domain is possible, since in the case of an MDCT-transformation or in the case of a similar Fourier-based transformation, these transformations are linear transformations. The transformations, therefore, possess the property of the mathematical additivity, namely $$f(x+y)=f(x)+f(y), \tag{1}$$

and that of mathematical homogeneity, namely $$f(a\cdot x)=a\cdot f(x), \tag{2}$$

wherein f(x) is an the transformation function, x and y suitable arguments thereof and a real-valued or complex-valued constant.

Both features of the MDCT-transformation or another Fourier-based transformation allow for a mixing in the respective frequency domain similar to mixing in the time domain. Hence, all calculations may equally well be carried out based on spectral values. A transformation of the data into the time domain is not needed.

Under some circumstances, a further condition might have to be met. All the relevant spectral data should be equal with respect to their time indices during the mixing process for all relevant spectral components. This may eventually not be the case if, during the transformation the so-called block-switching technique is employed so that the encoder of the conferencing terminals 160 may freely switch between different block lengths, depending on certain conditions. Block switching may endanger the possibility of uniquely assigning individual spectral values to samples in the time domain due to the switching between different block lengths and corresponding MDCT window lengths, unless the data to be mixed have been processed with the same windows. Since in a general system with distributed conferencing terminals 160, this may eventually not be guaranteed, complex interpolations might become indispensable which in turn may create additional delay and complexity. As a consequence, it may eventually be advisable not to implement a bit stream mixing process based on switching block lengths.

In contrast, the AAC-ELD codec is based on a single block length and, therefore, is capable of guaranteeing more easily the previously described assignment or synchronization of frequency data so that a mixing can more easily be realized. The conferencing system 100 shown in FIG. 3 is, in other words, a system which is able to perform the mixing in the transform-domain or frequency domain.

As previously outlined, in order to eliminate the additional delay introduced by the converters 190, 200 in the conference system 100 shown in FIG. 2, the codecs used in the conferencing terminals 160 use a window of fixed length and shape. This enables the implementation of the described mixing process directly without transforming the audio stream back into the time domain. This approach is capable of limiting the amount of additionally introduced algorithmic delay. Moreover, the complexity is decreased due to the absence of the inverse transform steps in the decoder and the forward transform steps in the encoder.

However, also in the framework of a conferencing system 100 as shown in FIG. 3, it may become essential to re-quantize the audio data after the mixing by the adders 130, which may introduce additional quantization noise. The additional quantization noise may, for instance, be created due to different quantization steps of different audio signals provided to the conferencing system 100. As a result, for example in the case of very low bitrate transmissions in which a number of quantization steps are already limited, the process of mixing two audio signals in the frequency domain or transformation domain may result in an undesired additional amount of noise or other distortions in the generated signal.

Figure 4:
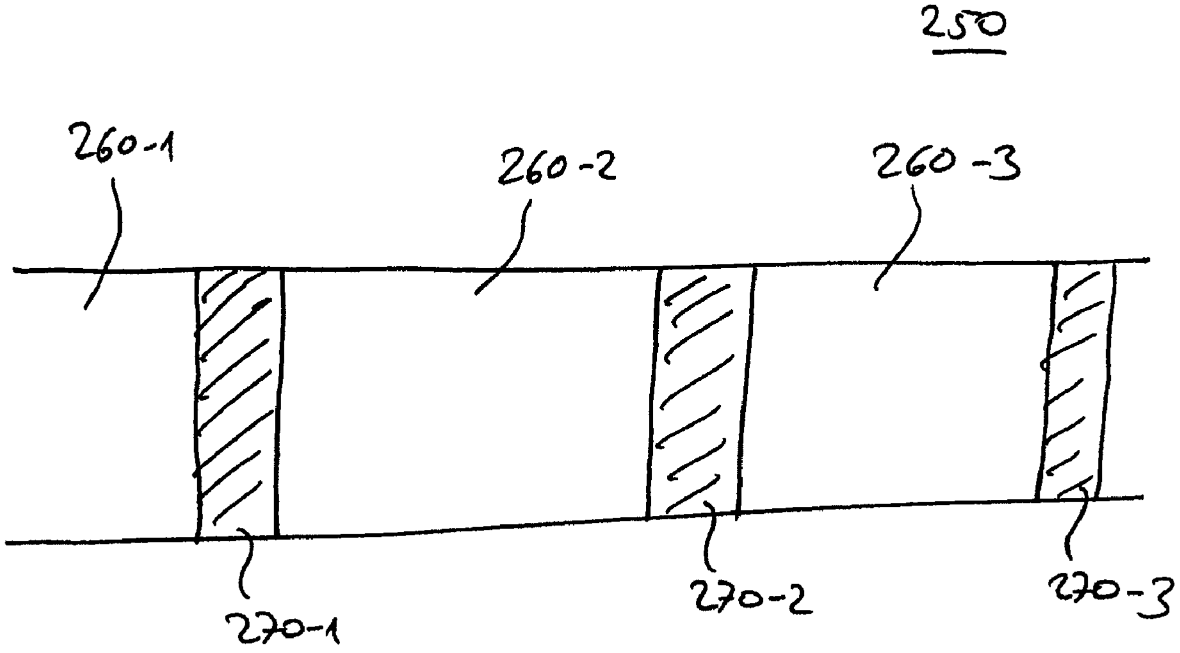
FIG. 4 shows a schematic drawing of data stream comprising a plurality of frames.

Before describing a first embodiment according to the present invention in the form of an apparatus for mixing a plurality of input data streams, with respect to FIG. 4, a data stream or bit stream, along with data comprised therein, will shortly be described.

FIG. 4 schematically shows a bit stream or data stream 250 which comprises at least one or, more often, more than one frame 260 of audio data in a spectral domain. More precisely, FIG. 4 shows three frames 260-1, 260-2, and 260-3 of audio data in a spectral domain. Moreover, the data stream 250 may also comprise additional information or blocks of additional information 270, such as control values indicating, for instance, a way the audio data are encoded, other control values or information concerning time indices or other relevant data. Naturally, the data stream 250 as shown in FIG. 4 may further comprise additional frames or a frame 260 may comprise audio data of more than one channel. For instance, in the case of a stereo audio signal, each of the frames 260 may, for instance, comprise audio data from a left channel, a right channel, audio data derived from both, the left and right channels, or any combination of the previously mentioned data.

Hence, FIG. 4 illustrates that a data stream 250 may not only comprise a frame of audio data in a spectral domain, but also additional control information, control values, status values, status information, protocol-related values (e.g. check sums), or the like.

Depending on the concrete implementation of the conferencing system as described in the context of FIGS. 1 to 3, or depending on the concrete implementation of an apparatus according to an embodiment of the present invention, as will be described below, in particular, in accordance with those described with respect to FIG. 9 to 12C, the control values indicating a way associated payload data of the frame represent at least a part of the spectral domain or spectral information of an audio signal may equally well be comprised in the frames 260 themselves, or in the associated block 270 of additional information. In case control values relate to spectral components, the control values may be encoded into the frames 260 themselves. If, however, a control value relates to a whole frame, it may equally well be comprised in the blocks 270 of additional information. However, the previously mentioned places for including the control values do, as described above, by far not need to be comprised in the frames 260 or the block 270 of the additional blocks. In the case a control value relates only to a single or a few spectral components, it may equally well be comprised in the block 270. On the other hand, a control value relating to a whole frame 260 may also be comprised in the frames 260.

Figure 5:
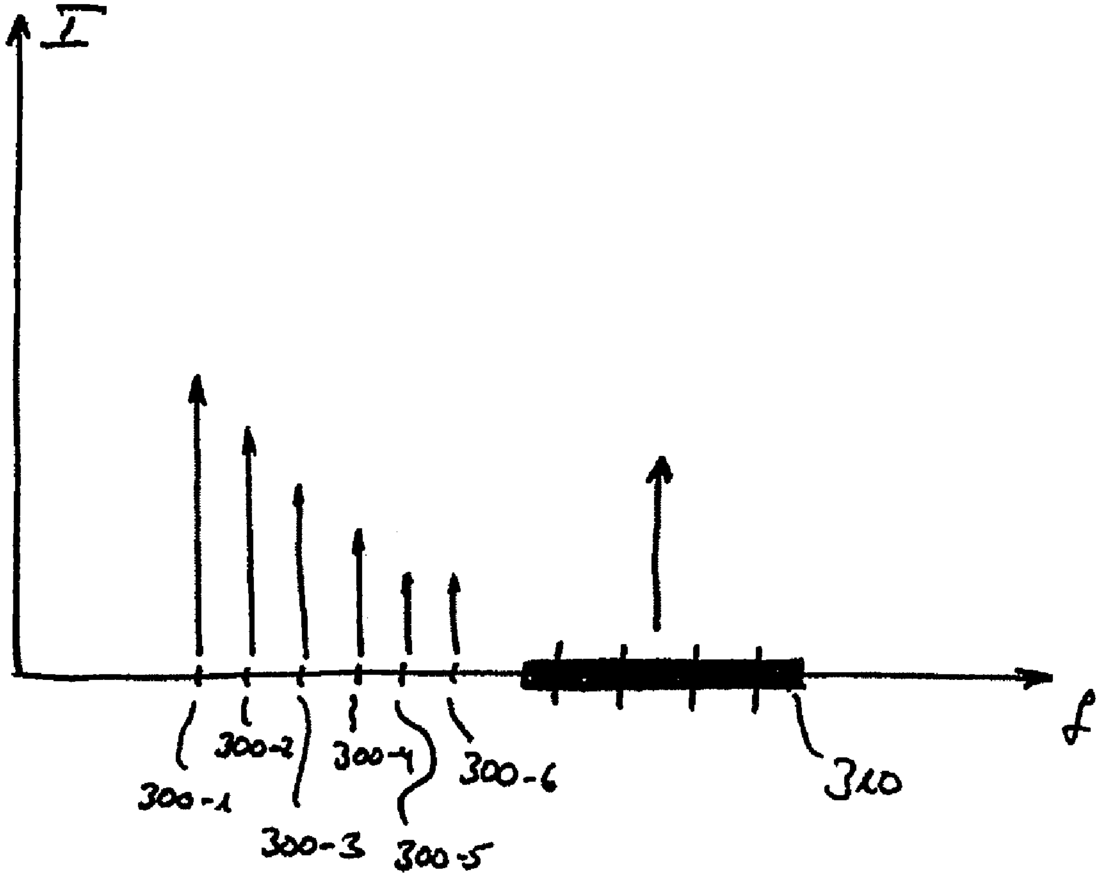
FIG. 5 illustrates different forms of spectral components and spectral data or information.

FIG. 5 schematically illustrates (spectral) information concerning spectral components as, for instance, comprised in the frame 260 of the data stream 250. To be more precise, FIG. 5 shows a simplified diagram of information in a spectral domain of a single channel of a frame 260. In the spectral domain, a frame of audio data may, for instance, be described in terms of its intensity values I as a function of the frequency f. In discrete systems, such as for instance digital systems, also the frequency resolution is discrete, so that the spectral information is typically only present for certain spectral components such as individual frequencies or narrow bands or subbands. Individual frequencies or narrow bands, as well as subbands, are referred to as spectral components.

FIG. 5 schematically shows an intensity distribution for six individual frequencies 300-1, . . . , 300-6, as well as a frequency band or subband 310 comprising, in the case as illustrated in FIG. 5, four individual frequencies. Both, individual frequencies or corresponding narrow bands 300, as well as the subband or frequency band 310, form spectral components with respect to which the frame comprises information concerning the audio data in the spectral domain.

The information concerning the subband 310 may, for instance, be an overall intensity, or an average intensity value. Apart from intensity or other energy-related values such as the amplitude, the energy of the respective spectral component itself, or another value derived from the energy or the amplitude, phase information and other information may also be comprised in the frame and, hence, be considered as information concerning a spectral component.

After having described some of the problems involved in and some background for conferencing systems, embodiments in accordance with a first aspect of the present invention are described according to which an input data stream is determined based on a comparison in order to copy at least partially spectral information from the determined input data stream to the output data stream, thereby enabling omitting a requantization and, hence, requantization noise associated therewith.

Figure 6:
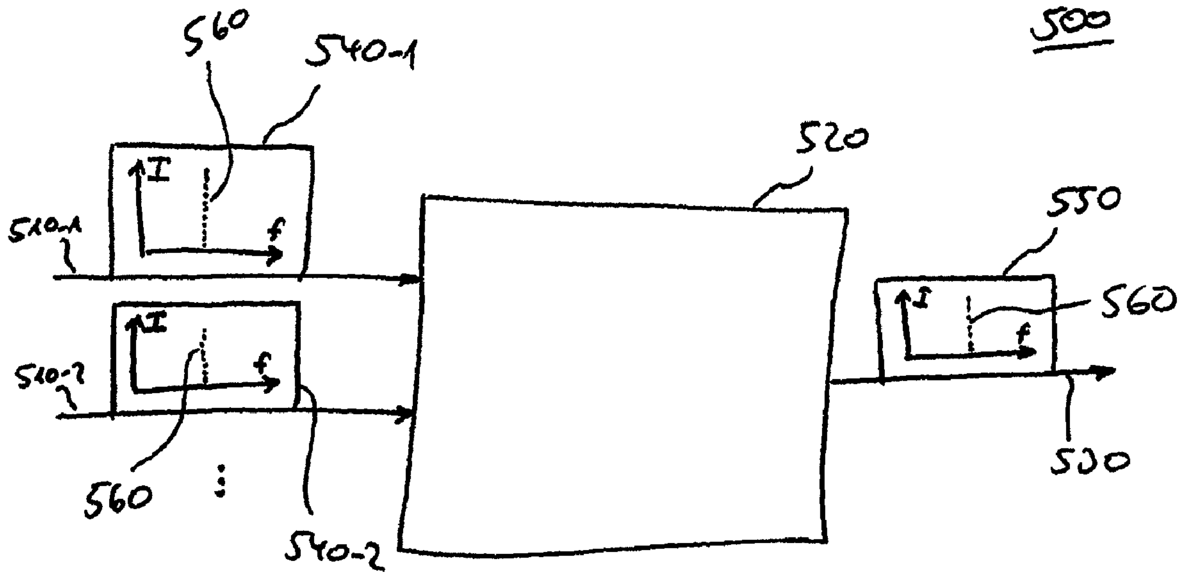
FIG. 6 illustrates an apparatus for mixing a plurality of input data streams according to an embodiment of the present invention in more detail.

FIG. 6 shows a block diagram of an apparatus 500 for mixing a plurality of input data streams 510, of which two are shown 510-1, 510-2. The apparatus 500 comprises a processing unit 520 which is adapted to receive the data streams 510 and to generate an output data stream 530. Each of the input data streams 510-1, 510-2 comprises a frame 540-1, 540-2, respectively, which similar to the frame 260 shown in FIG. 4 in context with FIG. 5, comprises an audio data in a spectral domain. This is once again illustrated by a coordinate system depicted in FIG. 6 on the abscissa, of which the frequency f and on the ordinate of which the intensity I is shown. The output data stream 530 also comprises an output frame 550 that comprises audio data in a spectral domain, and also illustrated by a corresponding coordinate system.

The processing unit 520 is adapted to compare the frames 540-1, 540-2 of a plurality of input data streams 510. As will be outlined in more detail below, this comparison may, for instance, be based on a psycho-acoustic model, taking masking effects and other properties of the human hearing characteristics into consideration. Based on this comparison result, the processing unit 520 is further adapted to determine at least for one spectral component, for instance, the spectral components 560 shown in FIG. 6, which is present in both frames 540-1, 540-2, exactly one data stream of the plurality of data streams 510. Then, the processing unit 520 may be adapted to generate the output data stream 530, comprising the output frame 550, such that an information concerning the spectral component 560 is copied from the determined frame 540 of the respective input data stream 510. To be more precise, the processing unit 520 is adapted such that comparing the frame 540 of the plurality of input data streams 510 is based on at least two pieces of information—the intensity values are related energy values—corresponding to the same spectral component 560 of frames 540 of two different input data streams 510.

Figure 7:
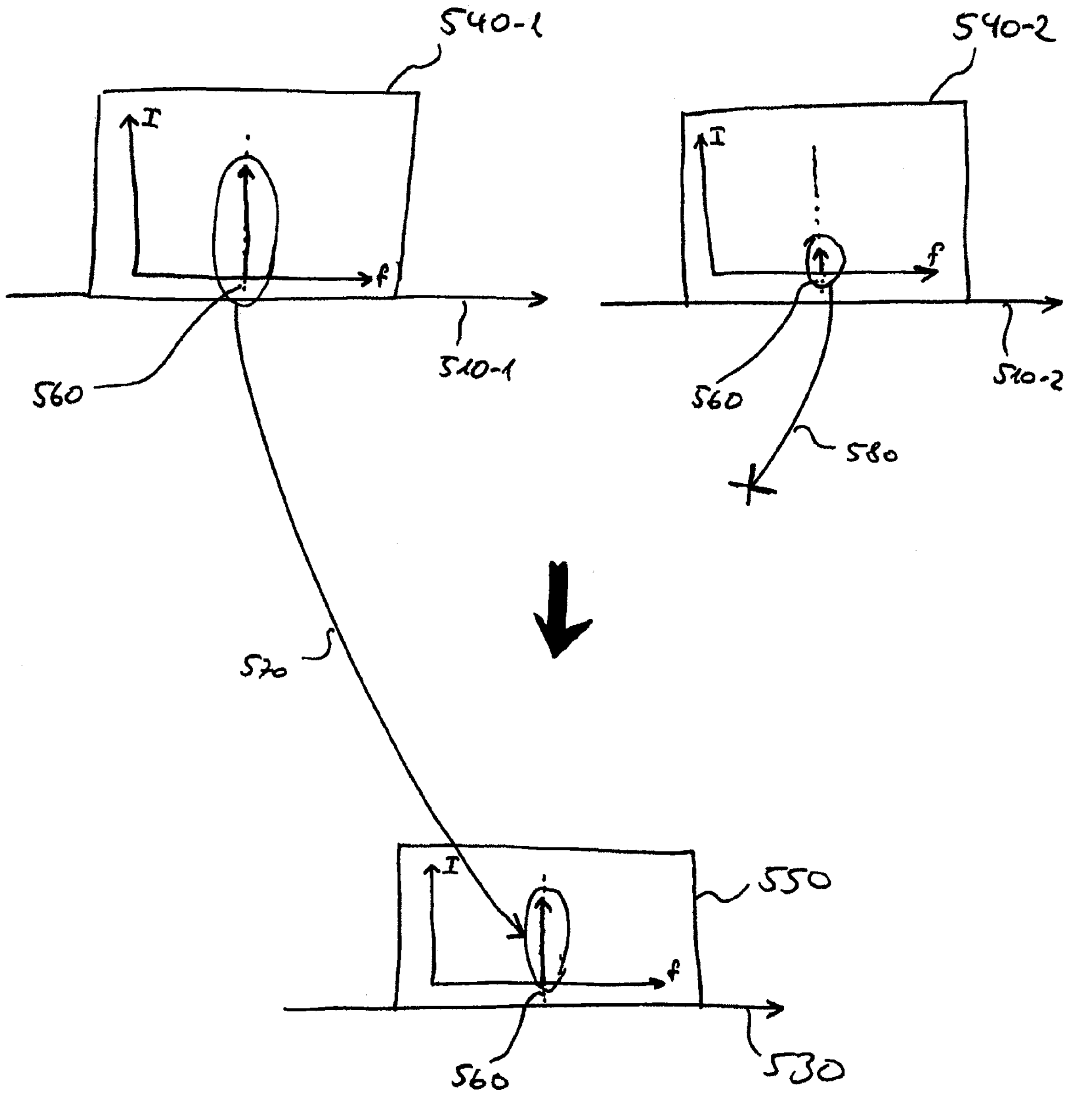
FIG. 7 illustrates a mode of operation of the apparatus of FIG. 6 according to an embodiment of the present invention.

To further illustrate this, FIG. 7 schematically shows the case in which the piece of information (the intensity I), corresponding to the spectral components 560, which is assumed here, to be a frequency or a narrow frequency band of the frame 540-1 of a first input data stream 510-1. This is compared with corresponding intensity value I, being the piece of information concerning the spectral component 560 of the frame 540-2 of the second input data stream 510-2. The comparison may, for instance, be done based on the evaluation of an energy ratio between the mixed signal where only some input streams are included and a complete mixed signal. This may, for instance, be achieved according to $$E_c = \sum_{n=1}^{N} E_n \tag{3}$$

and $$E_{f(n)} = \sum_{\substack{n=1 \\ n \neq 1}}^{N} E_i \tag{4}$$

and calculating the ratio r(n) according to $$r(n) = 20 \cdot \log \frac{E_{f(n)}}{E_c}, \tag{5}$$

wherein n is an index of an input data stream and N is the number of all or the relevant input data streams. If the ratio r(n) is high enough, the less dominant channels or less dominant frames of input data streams 510 may be seen as masked by the dominant ones. Thus, an irrelevance reduction may be processed, meaning that only those spectral components of a stream are included which are at all noticeable, while the other streams are discarded.

The energy values which are to be considered in the framework of equations (3) to (5) may, for instance, be derived from the intensity values as shown in FIG. 6 by calculating the square of the respective intensity values. In case information concerning the spectral components may comprise other values, a similar calculation may be carried out depending on the form of the information comprised in the frame 510. For instance, in the case of complex-valued information, calculating the modulus of the real and the imaginary components of the individual values making up the information concerning the spectral components may have to be performed.

Apart from individual frequencies, for the application of the psycho-acoustic module according to equations (3) to (5), the sums in equations (3) and (4) may comprise more than one frequency. In other words, in equations (3) and (4) the respective energy values $E_n$ may be replaced by an overall energy value corresponding to a plurality of individual frequencies, an energy of a frequency band, or to put it in more general terms, by a single piece of spectral information or a plurality of spectral information concerning one or more spectral components.

For instance, since the AAC-ELD operates on spectral lines in a band-wise manner, similar to frequency groups in which the human auditory system treats at the same time, the irrelevance estimation or the psycho-acoustic model may be carried out in a similar manner. By applying the psycho-acoustic model in this manner, it is possible to remove or substitute part of a signal of only a single frequency band, if necessitated.

As psycho-acoustic examinations have shown, masking of a signal by another signal depends on the respective signal types. As a minimum threshold for an irrelevance determination, a worst case scenario may be applied. For instance, for masking noise by a sinusoid or another distinct and well-defined sound, a difference of 21 to 28 dB is typically necessitated. Tests have shown that a threshold value of approximately 28.5 dB yields good substitute results. This value may eventually be improved, also taking the actual frequency bands under consideration into account.

Hence, values r(n) according to equation (5) being larger than −28.5 dB may be considered to be irrelevant in terms of a psycho-acoustic evaluation or irrelevance evaluation based on the spectral component or the spectral components under consideration. For different spectral components, different values may be used. Thus, using thresholds as indicators for a psycho-acoustic irrelevance of an input data stream in terms of the frame under consideration of 10 dB to 40 dB, 20 dB to 30 dB, or 25 dB to 30 dB may be considered useful.

In the situation depicted in FIG. 7, this means that with respect to the spectral component 560, the first input data stream 510-1 is determined, while the second input data stream 510-2 is discarded with respect to the spectral component 560. As a result, the piece of information concerning the spectral component 560 is at least partially copied from the frame 540-1 of the first input data stream 510-1 to the output frame 550 of the output data stream 530. This is illustrated in FIG. 7 by an arrow 570. At the same time, the pieces of information concerning the spectral components 560 of the frame 540 of the other input data streams 510 (i.e. in FIG. 7, frame 540-2 of input data stream 510-2) is disregarded as illustrated by the broken line 580.

In yet other words, the apparatus 500, which may, for instance, be used as an MCU or a conferencing system 100, is adapted such that the output data stream 530 together with its output frame 550 is generated, such that the information of the corresponding spectral component is copied from only the frame 540-1 of the determined input data stream 510-1 describing the spectral component 560 of the output frame 550 of the output data stream 530. Naturally, the apparatus 500 may also be adapted such that information concerning more than one spectral component may be copied from an input data stream, disregarding the other input data streams, at least with respect to these spectral components. It is furthermore possible that an apparatus 500, or its processing unit 520, is adapted such, that for different spectral components, different input data streams 510 are determined. The same output frame 550 of the output data stream 530 may comprise copied spectral information concerning different spectral components from different input data streams 510.

Naturally, it may advisable to implement apparatus 500 such that in the case of a sequence of frames 540 in an input data stream 510, only frames 540 will be considered during the comparison and determination, which correspond to a similar or same time index.

In other words, FIG. 7 illustrates the operational principles of an apparatus for mixing a plurality of input data streams as described above in accordance with an embodiment. As laid out before, mixing is not done in a straightforward manner in the sense that all incoming streams are decoded, which includes an inverse transformation to the time-domain, mixing and again re-encoding the signals.

Figure 8:
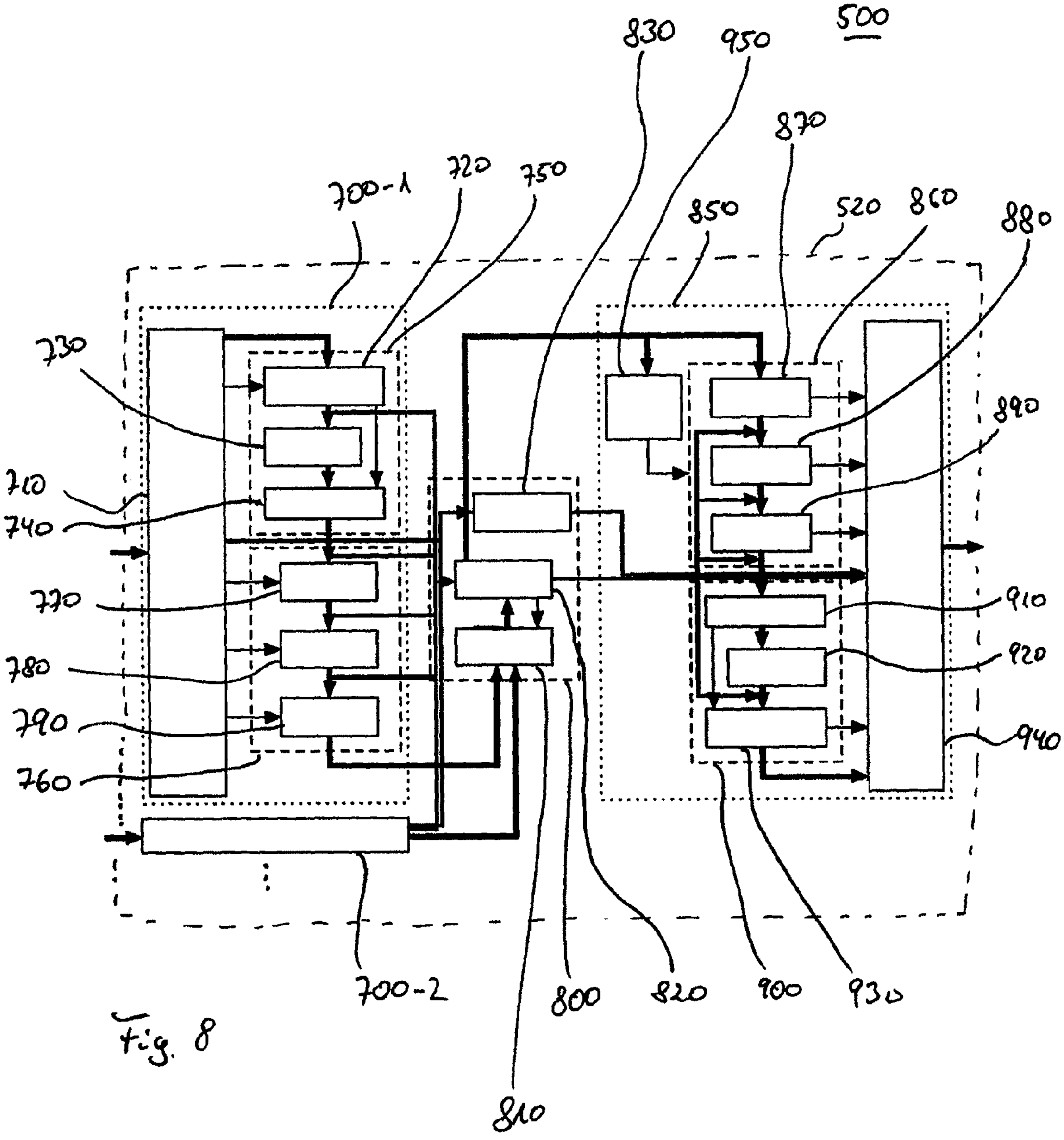
FIG. 8 shows a block diagram of an apparatus for mixing a plurality of input data streams according to a further embodiment of the present invention in the context of a conferencing system.

The Embodiments of FIG. 6 to 8 are based on mixing done in the frequency domain of the respective codec. A possible codec could be the AAC-ELD codec, or any other codec with a uniform transform window. In such a case, no time/frequency transformation is needed to be able to mix the respective data. Embodiments according to an embodiment of the present invention make use of the fact that access to all bit stream parameters, such as quantization step size and other parameters, is possible and that these parameters can be used to generate a mixed output bit stream.

The Embodiments of FIG. 6 to 8 make use of the fact that mixing of spectral lines or spectral information concerning spectral components can be carried out by a weighted summation of the source spectral lines or spectral information. Weighting factors can be zero or one, or in principle, any value in between. A value of zero means that sources are treated as irrelevant and will not be used at all. Groups of lines, such as bands or scale factor bands may use the same weighting factor. However, as illustrated before, the weighting factors (e.g. a distribution of zeros and ones) may be varied for the spectral components of a single frame 540 of a single input data stream 510. Moreover, it is not essential to exclusively use the weighting factors zero or one when mixing spectral information. It may be the case that under some circumstances, not for a single, one, a plurality of overall spectral information of a frame 540 of an input data stream 510, the respective weighting factors may be different from zero or one.

One particular case is that all bands or spectral component of one source (input data stream 510) are set to a factor of one and all factors of the other sources are set to zero. In this case, the complete input bit stream of one participant is identically copied as a final mixed bit stream. The weighting factors may be calculated on a frame-to-frame basis, but may also be calculated or determined based on longer groups or sequences of frames. Naturally, even inside such a sequence of frames or inside single frames, the weighting factors may differ for different spectral components, as outlined above. The weighting factors may be calculated or determined according to results of the psycho-acoustic model.

An example of a psycho-acoustic model has already been described above in context with the equations (3), (4), and (5). The psycho-acoustic model or a respective module calculates the energy ratio r(n) between a mixed signal where only some input streams are included leading to an energy value $E_f$ and the complete mixed signal having an energy value $E_c$. The energy ratio r(n) is then calculated according to equation (5) as 20 times the logarithmic of $E_f$ divided by $E_c$.

If the ratio is high enough, the less dominant channels may be regarded as masked by the dominant ones. Thus, an irrelevance reduction is processed meaning that only those streams are included which are not at all noticeable, to which a weighting factor of one is attributed, while all the other streams—at least one spectral information of one spectral component—are discarded. In other words, to these a weighting factor of zero is attributed.

The advantage that less or no tandem coding effects occur due to a reduced number of re-quantization steps may be introduced. Since each quantization step bares a significant danger of reducing additional quantization noise, the overall quality of the audio signal may be improved by employing any of the above-mentioned embodiments for mixing a plurality of input data streams. This may be the case when the processing unit 520 of the apparatus 500, as for example shown in FIG. 6, is adapted such that the output data stream 530 is generated such that a distribution of quantization levels compared to a distribution of quantization levels of the frame of the determined input stream or parts thereof is maintained. In other words, by copying and, hence, by reusing the respective data without re-encoding the spectral information, an introduction of additional quantization noise may be omitted.

Moreover, the conferencing system, for instance, a tele/video conferencing system with more than two participants employing any of the embodiment described above with respect to FIG. 6 to 8 may offer the advantage of a lesser complexity compared to a time-domain mixing, since time-frequency transformation steps and re-encoding steps may be omitted. Moreover, no further delay is caused by these components compared to mixing in the time-domain, due to the absence of the filterbank delay.

To summarize, the above-described embodiments may, for instance, be adapted such that bands or spectral information corresponding to spectral components, which are taken completely from one source, are not re-quantized. Therefore, only bands or spectral information which are mixed are re-quantized, which reduces additional quantization noise.

However, the above-described embodiments may also be employed in different applications, such as perceptual noise substitution (PNS), temporal noise shaping (TNS), spectral band replication (SBR), and modes of stereo coding. Before describing the operation of an apparatus capable of processing at least one of PNS parameters, TNS parameters, SBR parameters, or stereo coding parameters, an embodiment will be described in more detail with reference to FIG. 8.

FIG. 8 shows a schematic block diagram of an apparatus 500 for mixing a plurality of input data streams comprising a processing unit 520. To be more precise, FIG. 8 shows a highly flexible apparatus 500 being capable of processing highly different audio signals encoded in input data streams (bit streams). Some of the components which will be described below are, therefore, optional components which do not need to be implemented under all circumstances.

The processing unit 520 comprises a bit stream decoder 700 for each of the input data streams or coded audio bit streams to be processed by the processing unit 520. For sake of simplicity only, FIG. 8 shows only two bit stream decoders 700-1, 700-2. Naturally, depending on the number of input data streams to be processed, a higher number of bit stream decoders 700, or a lower number, may be implemented, if for instance a bit stream decoder 700 is capable of sequentially processing more than one of the input data streams.

The bit stream decoder 700-1, as well as the other bit stream decoders 700-2, . . . each comprise a bit stream reader 710 which is adapted to receive and process the signals received, and to isolate and extract data comprised in the bit stream. For instance, the bit stream reader 710 may be adapted to synchronize the incoming data with an internal clock and may furthermore be adapted to separate the incoming bit stream into the appropriate frames.

The bit stream decoder 700 further comprises a Huffman decoder 720 coupled to the output of the bit stream reader 710 to receive the isolated data from the bit stream reader 710. An output of the Huffman decoder 720 is coupled to a de-quantizer 730, which is also referred to as an inverse quantizer. The de-quantizer 730 being coupled behind the Huffman decoder 720 is followed by a scaler 740. The Huffman decoder 720, the de-quantizer 730 and the scaler 740 form a first unit 750 at the output of which at least a part of the audio signal of the respective input data stream is available in the frequency domain or the frequency-related domain in which the encoder of the participant (not shown in FIG. 8) operates.

The bit stream decoder 700 further comprises a second unit 760 which is coupled data-wise after the first unit 750. The second unit 760 comprises a stereo decoder 770 (M/S module) behind which a PNS-decoder is coupled. The PNS-decoder 780 is followed data-wise by a TNS-decoder 790, which along with the PNS-decoder 780 at the stereo decoder 770 forms the second unit 760.

Apart from the described flow of audio data, the bit stream decoder 700 further comprises a plurality of connections between different modules concerning control data. To be more precise, the bit stream reader 710 is also coupled to the Huffman decoder 720 to receive appropriate control data. Moreover, the Huffman decoder 720 is directly coupled to the scaler 740 to transmit scaling information to the scaler 740. The stereo decoder 770, the PNS-decoder 780, and the TNS-decoder 790 are also each coupled to the bit stream reader 710 to receive appropriate control data.

The processing unit 520 further comprises a mixing unit 800 which in turn comprises a spectral mixer 810 which is input-wise coupled to the bit stream decoders 700. The spectral mixer 810 may, for instance, comprises one or more adders to perform the actual mixing in the frequency-domain. Moreover, the spectral mixer 810 may further comprise multipliers to allow an arbitrary linear combination of the spectral information provided by the bit stream decoders 700.

The mixing unit 800 further comprises an optimizing module 820 which is data-wise coupled to an output of the spectral mixer 810. The optimizing module 820 is, however, also coupled to the spectral mixer 810 to provide the spectral mixer 810 with control information. Data-wise, the optimizing module 820 represents an output of the mixing unit 800.

The mixing unit 800 further comprises a SBR-mixer 830 which is directly coupled to an output of the bit stream reader 710 of the different bit stream decoders 700. An output of the SBR-mixer 830 forms another output of the mixing unit 800.

The processing unit 520 further comprises a bit stream encoder 850 which is coupled to the mixing unit 800. The bit stream encoder 850 comprises a third unit 860 comprising a TNS-encoder 870, PNS-encoder 880, and a stereo encoder 890, which are coupled in series in the described order. The third unit 860, hence, forms an inverse unit of the first unit 750 of the bit stream decoder 700.

The bit stream encoder 850 further comprises a fourth unit 900 which comprises a scaler 910, a quantizer 920, and a Huffman coder 930 forming a series connection between an input of the fourth unit and an output thereof. The fourth unit 900, hence, forms an inverse module of the first unit 750. Accordingly, the scaler 910 is also directly coupled to the Huffman coder 930 to provide the Huffman coder 930 with respective control data.

The bit stream encoder 850 also comprises a bit stream writer 940 which is coupled to the output of the Huffman coder 930. Further, the bit stream writer 940 is also coupled to the TNS-encoder 870, the PNS-encoder 880, the stereo encoder 890, and the Huffman coder 930 to receive control data and information from these modules. An output of the bit stream writer 940 forms an output of the processing unit 520 and of the apparatus 500.

The bit stream encoder 850 also comprises a psycho-acoustic module 950, which is also coupled to the output of the mixing unit 800. The bit stream encoder 850 is adapted to provide the modules of the third unit 860 with appropriate control information indicating, for instance, which may be employed to encode the audio signal output by the mixing unit 800 in the framework of the units of the third unit 860.

In principle, at the outputs of the second unit 760 up to the input of the third unit 860, a processing of the audio signal in the spectral domain, as defined by the encoder used on the sender side, is therefore possible. However, as indicated earlier, a complete decoding, de-quantization, de-scaling, and further processing steps may eventually not be necessitated if, for instance, spectral information of a frame of one of the input data streams is dominant. At least a part of the spectral information of the respective spectral components, is then copied to the spectral component of the respective frame of the output data stream.

To allow such a processing, the apparatus 500 and the processing unit 520 comprises further signal lines for an optimized data exchange. To allow such a processing in the embodiment shown in FIG. 8, an output of the Huffman decoder 720, as well as outputs of the scaler 740, the stereo decoder 770, and the PNS-decoder 780 are, along with the respective components of other bit stream readers 710, coupled to the optimizing module 820 of the mixing unit 800 for a respective processing.

To facilitate, after a respective processing, a corresponding dataflow inside the bit stream encoder 850, corresponding data lines for an optimized dataflow are also implemented. To be more precise, an output of the optimizing module 820 is coupled to an input of the PNS-encoder 780, the stereo encoder 890, an input of the fourth unit 900 and the scaler 910, as well as an input into the Huffman coder 930. Moreover, the output of the optimizing module 820 is also directly coupled to the bit stream writer 940.

As indicated earlier, almost all modules as described above are optional modules, which do not need to be implemented. For instance, in the case of the audio data streams comprising only a single channel, the stereo coding and decoding units 770, 890, may be omitted. Accordingly, in the case that no PNS-based signals are to be processed, the corresponding PNS-decoder and PNS-encoder 780, 880 may also be omitted. The TNS-modules 790, 870 may also be omitted in the case of the signal to be processed and the signal to be output is not based on TNS-data. Inside the first and fourth units 750, 900 the inverse quantizer 730, the scaler 740, the quantizer 920, as well as the scaler 910 may eventually also be omitted. The Huffman decoder 720 and the Huffman encoder 930 may be implemented differently, using another algorithm, or completely omitted.

The SBR-mixer 830 may also eventually be omitted if, for instance, no SBR-parameters of data are present. Furthermore, the spectral mixer 810 may be implemented differently for instance in cooperation with the optimizing module 820 and the psycho-acoustic module 860. Therefore, also these modules are to be considered optional components.

With respect to the mode of operation of the apparatus 500 along with the processing unit 520 comprised therein, an incoming input data stream is first read and separated into appropriate pieces of information by the bit stream reader 710. After Huffman decoding, the resulting spectral information may eventually be re-quantized by the de-quantizer 730 and scaled appropriately by the de-scaler 740.

Afterwards, depending on the control information comprised in the input data stream, the audio signal encoded in the input data stream may be decomposed into audio signals for two or more channels in the framework of the stereo decoder 770. If, for instance, the audio signal comprises a mid-channel (M) and a side-channel (S), the corresponding left-channel and right-channel data may be obtained by adding and subtracting the mid- and side-channel data from one another. In many implementations, the mid-channel is proportional to the sum of the left-channel and the right-channel audio data, while the side-channel is proportional to a difference between the left-channel (L) and the right-channel (R). Depending on the implementation, the above-referenced channels may be added and/or subtracted taking a factor ½ into account to prevent clipping effects. Generally speaking, the different channels can processed by linear combinations to yield the corresponding channels.

In other words, after the stereo decoder 770, the audio data may, if appropriate, be decomposed into two individual channels. Naturally, also an inverse decoding may be performed by the stereo decoder 770. If, for instance, the audio signal as received by the bit stream reader 710 comprises a left- and a right-channel, the stereo decoder 770 may equally well calculate or determine appropriate mid- and side-channel data.

Depending on the implementation not only of the apparatus 500, but also depending on the implementation of the encoder of the participant providing the respective input data stream, the respective data stream may comprise PNS-parameters (PNS=perceptual noise substitution). PNS is based on the fact that the human ear is most likely not capable of distinguishing noise-like sounds in a limited frequency range or spectral component such as a band or an individual frequency, from a synthetically generated noise. PNS therefore substitutes the actual noise-like contribution of the audio signal with an energy value indicating a level of noise to be synthetically introduced into the respective spectral component and neglecting the actual audio signal. In other words, the PNS-decoder 780 may regenerate in one or more spectral components the actual noise-like audio signal contribution based on a PNS parameter comprised in the input data stream.

In terms of the TNS-decoder 790 and the TNS-encoder 870, respective audio signals might have to be retransformed into an unmodified version with respect to a TNS-module operating on the sender side. Temporal noise shaping (TNS) is a means to reduce pre-echo artifacts caused by quantization noise, which may be present in the case of a transient-like signal in a frame of the audio signal. To counteract this transient, at least one adaptive prediction filter is applied to the spectral information starting from the low side of the spectrum, the high side of the spectrum, or both sides of the spectrum. The lengths of the prediction filters may be adapted as well as the frequency ranges to which the respective filters are applied.

In other words, the operation of a TNS-module is based on computing one or more adaptive IIR-filters (IIR=infinite impulse response) and by encoding and transmitting an error signal describing the difference between the predicted and actual audio signal along with the filter coefficients of the prediction filters. As a consequence, it may be possible to increase the audio quality while maintaining the bitrate of the transmitter data stream by coping with the transient-like signals by applying a prediction filter in the frequency domain to reduce the amplitude of the remaining error signal, which might then be encoded using less quantization steps as compared to directly encoding the transient-like audio signal with a similar quantization noise.

In terms of a TNS-application, it may be advisable under some circumstances to employ the function of the TNS-decoder 760 to decode the TNS-part of the input data stream to arrive at a “pure” representation in the spectral domain determined by the codec used. This application of the functionality of the TNS-decoders 790 may be useful if an estimation of the psycho-acoustic model (e.g. applied in the psycho-acoustic module 950) cannot already be estimated based on the filter coefficients of the prediction filters comprised in the TNS-parameters. This may especially be important in the case when at least one input data stream uses TNS, while another does not.

When the processing unit determines, based on the comparison of the frames of input data streams that the spectral information from a frame of an input data stream using TNS are to be used, the TNS-parameters may be used for the frame of output data. If, for instance for incompatibility reasons, the recipient of the output data stream is not capable of decoding TNS data, it might be useful not to copy the respective spectral data of the error signal and the further TNS parameters, but to process the reconstructed data from the TNS-related data to obtain the information in the spectral domain, and not to use the TNS encoder 870. This once again illustrates that parts of the components or modules shown in FIG. 8 do not need to be implemented but may, optionally, be left away.

In the case of at least one audio input stream comparing PNS data, a similar strategy may be applied. If in the comparison of the frames for a spectral component of the input data streams reveal that one input data stream is in terms of its present frame and the respective spectral component or the spectral components dominating, the respective PNS-parameters (i.e. the respective energy values) may also be copied directly to the respective spectral component of the output frame. If, however, the recipient is not capable of accepting the PNS-parameters, the spectral information may be reconstructed from the PNS-parameter for the respective spectral components by generating noise with the appropriate energy level as indicated by the respective energy value. Then, the noise data may accordingly be processed in the spectral domain.

As outlined before, the transmitted data may also comprise SBR data, which may be processed in the SBR mixer 830. Spectral band replication (SBR) is a technique to replicate a part of a spectrum of an audio signal based on the contributions and the lower part of the same spectrum. As a consequence, the upper part of the spectrum need not be transmitted, apart from SBR-parameters which describe energy values in a frequency dependent and time-dependent manner by employing an appropriate time/frequency grid. As a consequence, the upper part of the spectrum need not be transmitted at all. To be able to further improve the quality of the reconstructed signal, additional noise contributions and sinusoid contributions may be added in the upper part of the spectrum.

To be a slightly more specific, for frequencies above a cross-over frequency $f_x$, the audio signal is analyzed in terms of a QMF filterbank (QMF=quadrature mirror filter) which creates a specific number of subband signals (e.g. 32 subband signals) having a time resolution which is reduced by a factor equal to, or proportional to the number of subbands of the QMF filterbank (e.g. 32 or 64). As a consequence, a time/frequency grid may be determined comprising on the time axis two or more so-called envelopes and, for each envelope, typically 7 to 16 energy values describing the respective upper part of the spectrum.

Additionally, the SBR-parameters may comprise information concerning additional noise and sinusoids which are then attenuated or determined with respect to their strength by the previously mentioned time/frequency grid.

In the case of an SBR-based input data stream being the dominant input data stream with respect to the present frame, copying the respective SBR-parameters along with the spectral components may be performed. If, once again, the recipient is not capable of decoding SBR-based signals, a respective reconstruction into the frequency domain may be performed followed by encoding the reconstructed signal according to the requirements of the recipient.

Since SBR allows for two coding stereo channels, coding the left-channel and the right-channel separately, as well as coding same in terms of a coupling channel (C), according to an embodiment of the present invention, copying the respective SBR-parameters or at least parts thereof, may comprise copying the C elements of the SBR parameters to both, the left and right elements of the SBR parameter to be determined and transmitted, or vice-versa, depending on the results of the comparison and the result of the determination.

Moreover, since in different embodiments of the present invention input data streams may comprise both, mono and stereo audio signals comprising one and two individual channels, respectively, a mono to stereo upmix or a stereo to mono downmix may additionally be performed in the framework of copying at least parts of information when generating at least part of information of a corresponding spectral component of the frame of the output data stream.

As the preceding description has shown, the degree of copying spectral information and/or respective parameters relating to spectral components and spectral information (e.g. TNS-parameters, SBR-parameters, PNS-parameters) may be based on different numbers of data to be copies and may determine whether the underlying spectral information or pieces thereof also need to be copied. For instance, in the case of copying SBR-data, it may be advisable to copy the whole frame of the respective data stream to prevent complicated mixing spectral information for different spectral components. Mixing these may necessitate a re-quantization which may in fact reduce quantization noise.

In terms of TNS-parameters it may also be advisable to copy the respective TNS-parameters along with the spectral information of the whole frame from the dominating input data stream to the output data stream to prevent a re-quantization.

In case of PNS-based spectral information, copying individual energy values without copying the underlying spectral components may be viable way. In addition, in this case by copying only the respective PNS-parameter from the dominating spectral component of the frames of the pluralities of input data streams to the corresponding spectral component of the output frame of the output data stream occurs without introducing additional quantization noise. It should be noted that also by re-quantizing an energy value in the form of a PNS-parameter, additional quantization noise may be introduced.

As outlined before, the embodiment outlined above may also be realized by simply copying a spectral information concerning a spectral component after comparing the frames of the plurality of input data streams and after determining, based on the comparison, for a spectral component of an output frame of the output data stream exactly one data stream to be the source of the spectral information.

The replacement algorithm performed in the framework of the psycho-acoustic module 950 examines each of the spectral information concerning the underlying spectral components (e.g. frequency bands) of the resulting signal to identify spectral components with only a single active component. For these bands, the quantized values of the respective input data stream of input bit stream may be copied from the encoder without re-encoding or re-quantizing the respective spectral data for the specific spectral component. Under some circumstances all quantized data may be taken from a single active input signal to form the output bit stream or output data stream so that—in terms of the apparatus 500—a lossless coding of the input data stream is achievable.

Furthermore, it may become possible to omit processing steps such as the psycho-acoustic analysis inside the encoder. This allows shortening the encoding process and, thereby, reducing the computational complexity since, in principle, only copying of data from one bit stream into another bit stream have to be performed under the certain circumstances.

For instance, in the case of PNS, a replacement can be carried out since noise factors of the PNS-coded band may be copied from one of the output data streams to the output data stream. Replacing individual spectral components with appropriate PNS-parameters is possible, since the PNS-parameters are spectral component-specific, or in other words, to a very good approximation independent from one another.

However, it may occur that a two aggressive application of the described algorithm may yield a degraded listening experience or an undesired reduction in quality. It may, hence, be advisable to limit replacement to individual frames, rather than spectral information, concerning individual spectral components. In such a mode of operation the irrelevance estimation or irrelevance determination, as well as replacement analysis may be carried out unchanged. However, a replacement may, in this mode of operation, only be carried out when all or at least a significant number of spectral components within the active frame are replaceable.

Although this might lead to a lesser number of replacements, an inner strength of the spectral information may in some situations be improved leading to an even slightly improved quality.

In the following, embodiments in accordance with a second aspect of the present invention are described according to which control values associated with payload data of the respective input data streams are taken into account, the control values indicating a way the payload data represents at least a part of the corresponding spectral information or spectral domain of the respective audio signals, wherein, in case control values of the two input data streams are equal, a new decision on the way the spectral domain at the respective frame of the output data stream is avoided and instead the output stream generation relies on the decision already determined by the encoders of the input data streams. In accordance with some embodiments described below, retransforming the respective payload data back into another way of representing the spectral domain such as the normal or plain way with one spectral value per time/spectral sample, is avoided.

As laid out before, embodiments according to the present invention are based on performing a mixing, which is not done in a straightforward manner in the sense that all incoming streams are decoded, which includes an inverse transformation to the time-domain, mixing and again re-encoding the signals. Embodiments according to the present invention are based on mixing done in the frequency domain of the respective codec. A possible codec could be the AAC-ELD codec, or any other codec with a uniform transform window. In such a case, no time/frequency transformation is needed to be able to mix the respective data. Further, access to all bit stream parameters, such as quantization step size and other parameters, is possible and these parameters can be used to generate a mixed output bit stream.

Additionally, mixing of spectral lines or spectral information concerning spectral components can be carried out by a weighted summation of the source spectral lines or spectral information. Weighting factors can be zero or one, or in principle, any value in between. A value of zero means that sources are treated as irrelevant and will not be used at all. Groups of lines, such as bands or scale factor bands may use the same weighting factor. The weighting factors (e.g. a distribution of zeros and ones) may be varied for the spectral components of a single frame of a single input data stream. The embodiments described below do by far not need to exclusively use the weighting factors of zero or one when mixing spectral information. It may be the case that under some circumstances, not for a single, one, a plurality of overall spectral information of a frame of an input data stream, the respective weighting factors may be different from zero or one.

One particular case is that all bands or spectral component of one source (input data stream) are set to a factor of one and all factors of the other sources are set to zero. In this case, the complete input bit stream of one participant can identically copied as a final mixed bit stream. The weighting factors may be calculated on a frame-to-frame basis, but may also be calculated or determined based on longer groups or sequences of frames. Naturally, even inside such a sequence of frames or inside single frames, the weighting factors may differ for different spectral components, as outlined above. The weighting factors may, in some embodiments, be calculated or determined according to results of the psycho-acoustic model.

Such a comparison may, for instance, be done based on the evaluation of an energy ratio between the mixed signal where only some input streams are included and a complete mixed signal. This may, for instance, be achieved as described above with respect to equations (3) to (5). In other words, the psycho-acoustic model may calculate the energy ratio r(n) between a mixed signal where only some input streams are included leading to an energy value $E_f$ and the complete mixed signal having an energy value $E_c$. The energy ratio r(n) is then calculated according to equation (5) as 20 times the logarithmic of $E_f$ divided by $E_c$.

Accordingly, similar to the above description of embodiments with respect to FIG. 6 to 8, if the ratio is high enough, the less dominant channels may be regarded as masked by the dominant ones. Thus, an irrelevance reduction is processed meaning that only those streams are included which are not at all noticeable, to which a weighting factor of one is attributed, while all the other streams—at least one spectral information of one spectral component—are discarded. In other words, to these a weighting factor of zero is attributed.

This may lead to an additional advantage that less or no tandem coding effects occur due to a reduced number of re-quantization steps. Since each quantization step bares a significant danger of reducing additional quantization noise, the overall quality of the audio signal may, hence, be improved.

Similar to the above-described embodiments of FIG. 6 to 8, the embodiments described below may be used with a conferencing system which may, for instance, be a tele/video conferencing system with more than two participants, and may offer the advantage of a lesser complexity compared to a time-domain mixing, since time-frequency transformation steps and re-encoding steps may be omitted. Moreover, no further delay is caused by these components compared to mixing in the time-domain, due to the absence of the filterbank delay.

Figure 9:
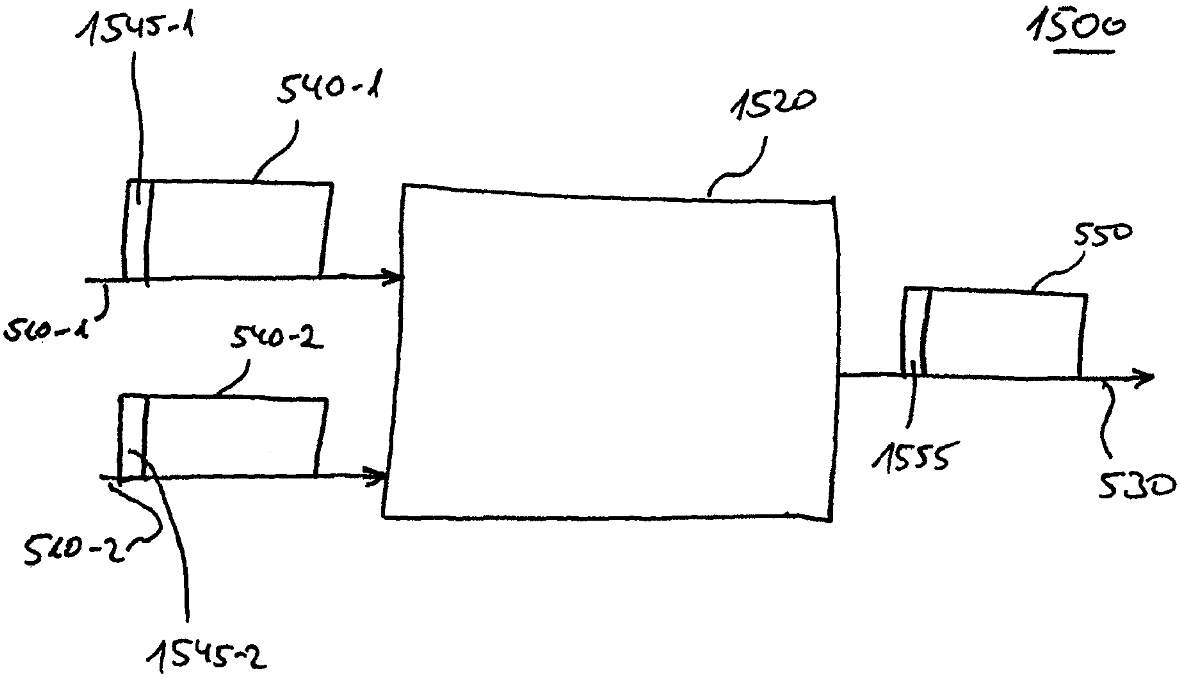
FIG. 9 shows a simplified block diagram of an apparatus for generating an output data stream according to an embodiment of the present invention.

FIG. 9 shows a simplified block diagram of an apparatus 500 for mixing input data streams according to an embodiment of the present invention. Most of the reference signs have been adopted from the embodiments of FIG. 6 to 8 in order to ease the understanding and avoid duplicate descriptions. Other reference signs have been increased by 1000 in order to denote that the functionality of same is defined differently as compared to the above embodiments of FIG. 6 to 8—in either additional functionalities or alternative functionality, but with the general function of the respect element being comparable.

Based on the first input data stream 510-1, and a second input data stream 510-2, a processing unit 1520 comprised in the apparatus 1500 is adapted to generate an output data stream 1530. The first and second input data streams 510 each comprise a frame 540-1, 540-2, respectively, which each comprise a control value 1545-1, 1545-2, respectively, which indicates a way the payload data of the frames 540 represent at least a part of the spectral domain or spectral information of an audio signal.

The output data stream 530 also comprises an output frame 1550 with a control value 555, indicating in a similar manner, a way in which payload data of the output frame 550 represent spectral information in the spectral domain of the audio signal encoded in the output data stream 530.

The processor unit 1520 of the apparatus 1500 is adapted to compare the control values 1545-1 of the frame 540-1 of the first input data stream 510-1 and the control value 1545-2 of a frame 540-2 of the second input data stream 510-2 to yield a comparison result. Based in this comparison result, the processor unit 1520 is further adapted to generate the output data stream 530 comprising the output frame 550, such that when the comparison result indicates that the control values 1545 of the frames 540 of the first and second input data streams 510 are identical or equal, the output frame 550 comprises as the control value 1550 a value equal to that of the control values 1545 of the frames 540 of the two input data streams 510. The payload data comprised in the output frame 550 are derived from the corresponding payload data of the frames 540 with respect to the identical control values 1545 of the frames 540 by processing in the spectral domain, i.e. without visiting the time-domain.

If, for instance, the control values 1545 indicate a specialized coding of spectral information of one or more spectral components (e.g. PNS data), and the respective control values 1545 of the two input data streams are identical, then the corresponding spectral information of the output frame 550, corresponding to the same spectral component or spectral components, may be obtained by processing the corresponding payload data in the spectral domain even directly, that is by not-leaving the kind of representation of the spectral domain. As will be outlined below, in the case of a PNS-based spectral representation, this may be achieved by summing up the respective PNS-data, optionally accompanied by a normalization process. That is, the PNS-data of neither input data stream is converted back into plain representation with one value per spectral sample.

Figure 10:
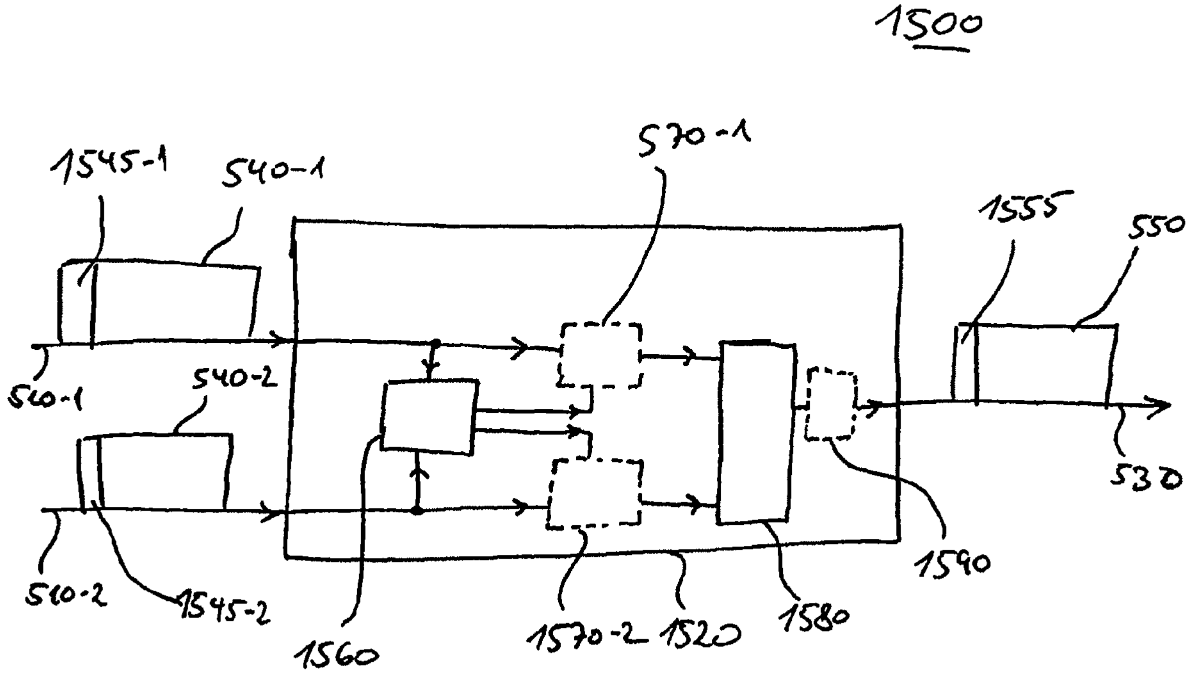
FIG. 10 shows a more detailed block diagram of an apparatus for generating an output data stream according to an embodiment of the present invention.

FIG. 10 shows a more detailed diagram of an apparatus 1500 which differs from FIG. 9 mainly with respect to an inner structure of the processing unit 1520. To be more specific, the processing unit 1520 comprises a comparator 1560, which is coupled to appropriate inputs for first and second input data streams 510 and which is adapted to compare the control values 1545 of their respective frames 540. The input data streams are furthermore provided to an optional transformer 1570-1, 1570-2, for each of the two input data streams 510. The comparator 1560 is also coupled to the optional transformers 1570 to provide same with the comparison result.

The processing unit 1520 further comprises a mixer 1580, which is coupled input-wise to the optional transformers 1570—or in case one or more of the transformers 1570 are not implemented—to the corresponding inputs for the input data streams 510. The mixer 1580 is coupled with an output to an optional normalizer 1590, which in turn is coupled, if implemented, with an output of the processing unit 1520 and that of the apparatus 1500 to provide the output data stream 530.

As outlined before, the comparator 1560 is adapted to compare the control values of the frames 1540 of the two input data streams 510. The comparator 1560 provides, if implemented, the transformers 1570 with a signal indicating whether the control values 1545 of the respective frames 540 are identical, or not. If the signal representing the comparison result indicates that the two control values 1545 are, at least with respect to one spectral component, identical or equal, the transformers 1570 do not transform the respective payload data as comprised in the frames 540.

The payload data comprised in the frames 540 of the input data streams 510 will then be mixed by the mixer 1580 and output to the normalizer 1590, if implemented, to perform a normalization step in order to ensure that the resulting values will not overshoot or undershoot an allowable range of values. Examples of mixing payload data will be outlined in more detail below in context with FIG. 12*a* to 12*c*.

The normalizer 1590 may be implemented as a quantizer adapted to re-quantize the payload data according to their respective values, alternatively, the normalizer 1590 may also be adapted to just alter a scale factor indicating a distribution of quantization steps or an absolute value of a minimum or maximum quantization level, depending on the concrete implementation thereof.

In case the comparator 1560 indicates that the control values 1545 are, at least with respect to one or more spectral components different, the comparator 1560 may provide one or both of the transformers 1570 with a respective control signal indicating the respective transformers 1570 to transform the payload data of at least one of the input data streams 510 to that of the other input data stream. In this case, the transformer may be adapted to simultaneously change the control value of the transformed frame such that the mixer 1580 is capable of generating the output frame 550 of the output data stream 530 with a control value 1555 being equal to that of a frame 540 of the two input data streams, which is not transformed or with a common value of a payload data of both frames 540.

More detailed examples will be described below in context with FIGS. 12*a* to 12*c* for different applications such as PNS-implementations, SBR-implementations, and M/S-implementations, respectively.

Figure 11:
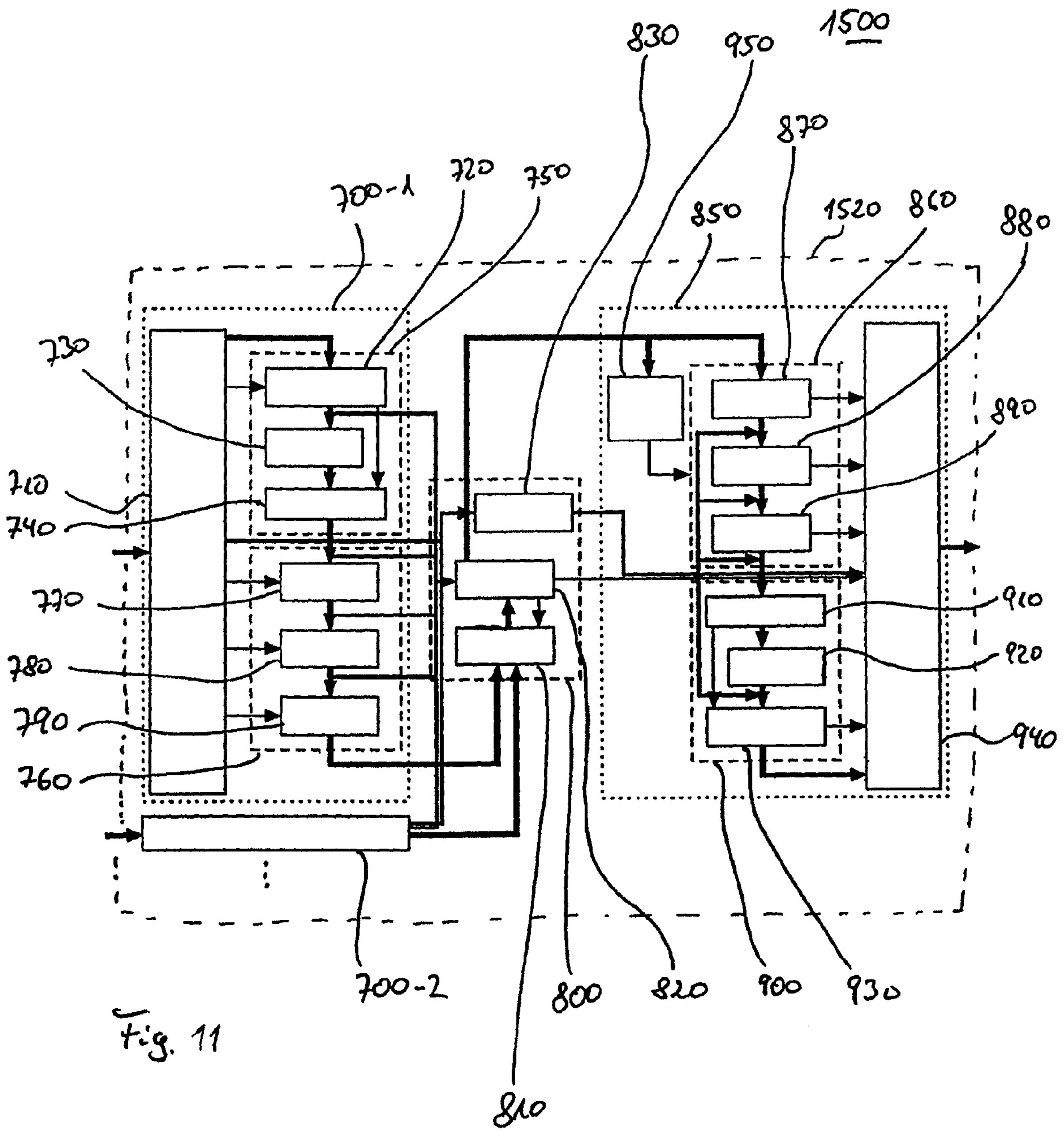
FIG. 11 shows a block diagram of an apparatus for generating an output data stream from a plurality of input data streams according to a further embodiment of the present invention in the context of a conferencing system.

Is should be pointed out that the embodiments of FIG. 9 to 12C are by far not limited to two input data streams 1510-1, 1510-2 as shown in FIGS. 9, 10 and the upcoming FIG. 11. Rather, same may be adapted to process a plurality of input data streams comprising more than two input data streams 510. In this case, the comparator 1560 may, for instance, be adapted to compare an appropriate number of input data streams 510 and the frames 540 comprised therein. Moreover, depending on the concrete implementation, an appropriate number of transformers 1570 may also be implemented. The mixer 1580 along with the optional normalizer 1590 may eventually be adapted to the increased number of data streams to be processed.

In the case of more than just two input data streams 510, the comparator 1560 may be adapted to compare all the relevant control values 1545 of the input data streams 510 to decide as to whether a transforming step is to be performed by one or more of the optionally implemented transformers 1570. Alternatively or additionally, the comparator 1560 may also be adapted to determine a set of input data streams to be transformed by the transformers 1570, when the comparison result indicates that a transformation to a common manner of representation of the payload data is achievable. For instance, unless the different representation of payload data involved necessitates a certain representation, the comparator 1560 may for instance be adapted to activate the transformers 1570 in such a way as to minimize the overall complexity. This may, for instance, be achieved based on predetermined estimations of complexity values stored within the comparator 1560 or available to the comparator 1560 in a different manner.

Furthermore, it should be noted that the transformer 1570 may eventually be omissible when, for instance, a transformation into the frequency domain may optionally be carried out by the mixer 1580 on demand. Alternatively, or additionally, the functionality of the transformers 1570 may also be incorporated into the mixer 1580.

Further, it should be noted that the frames 540 may comprise more than one control value, such as perceptual noise substitution (PNS), temporal noise shaping (TNS) and modes of stereo coding. Before describing the operation of an apparatus capable of processing at least one of PNS parameters, TNS parameters or stereo coding parameters, reference is made to FIG. 11 which equals FIG. 8 with however, the reference signs 1500 and 1520 being used instead of 500 and 520, respectively, in order to show that FIG. 8 already shows an embodiment for generating an output data stream from first and second input data streams in which the processing unit 520 and 1520, respectively, may also be adapted to carry out the functionality described with respect to FIGS. 9 and 10. In particular, within processing unit 1520, the mixing unit 800 comprising the spectral mixer 810, the optimizing module 820, and the SBR mixer 830 performs the previously described functions set out with respect to FIGS. 9 and 10. As indicated earlier, the control values comprised in the frames of the input data streams may equally well be PNS-parameters, SBR-parameters, or control data concerning stereo encoding, in other words, M/S-parameters. In case the respective control values are equal or identical, the mixing unit 800 may process the payload data to generate corresponding payload data to be further processed to be comprised in the output frame of the output data stream. In this regard, as already stated above, since SBR allows for two coding stereo channels, coding the left-channel and the right-channel separately, as well as coding same in terms of a coupling channel (C), according to an embodiment of the present invention, processing the respective SBR-parameters or at least parts thereof, may comprise processing the C elements of the SBR parameters to obtain both, the left and right elements of the SBR parameter, or vice-versa, depending on the results of the comparison and the result of the determination. Similarly, the degree of processing spectral information and/or respective parameters relating to spectral components and spectral information (e.g. TNS-parameters, SBR-parameters, PNS-parameters) may be based on different numbers of data to be processed and may determine whether the underlying spectral information or pieces thereof also need to be decoded. For instance, in the case of copying SBR-data, it may be advisable to process the whole frame of the respective data stream to prevent complicated mixing spectral information for different spectral components. Mixing these may necessitate a re-quantization which may in fact reduce quantization noise. In terms of TNS-parameters it may also be advisable to decompose the respective TNS-parameters along with the spectral information of the whole frame from the dominating input data stream to the output data stream to prevent a re-quantization. In case of PNS-based spectral information, processing individual energy values without copying the underlying spectral components may be viable way. In addition, in this case by processing only the respective PNS-parameter from the dominating spectral component of the frames of the pluralities of input data streams to the corresponding spectral component of the output frame of the output data stream occurs without introducing additional quantization noise. It should be noted that also by re-quantizing an energy value in the form of a PNS-parameter, additional quantization noise may be introduced.

With respect to FIGS. 12A to 12C, three different modes of mixing payload data on the basis of a comparison of respective control values will be described in more detail. FIG. 12*a* shows an example of a PNS-based implementation of an apparatus 500 according to an embodiment of the present invention, whereas FIG. 12*b* shows a similar SBR-implementation and FIG. 12*c* shows an M/S-implementation thereof.

Figure 12A:
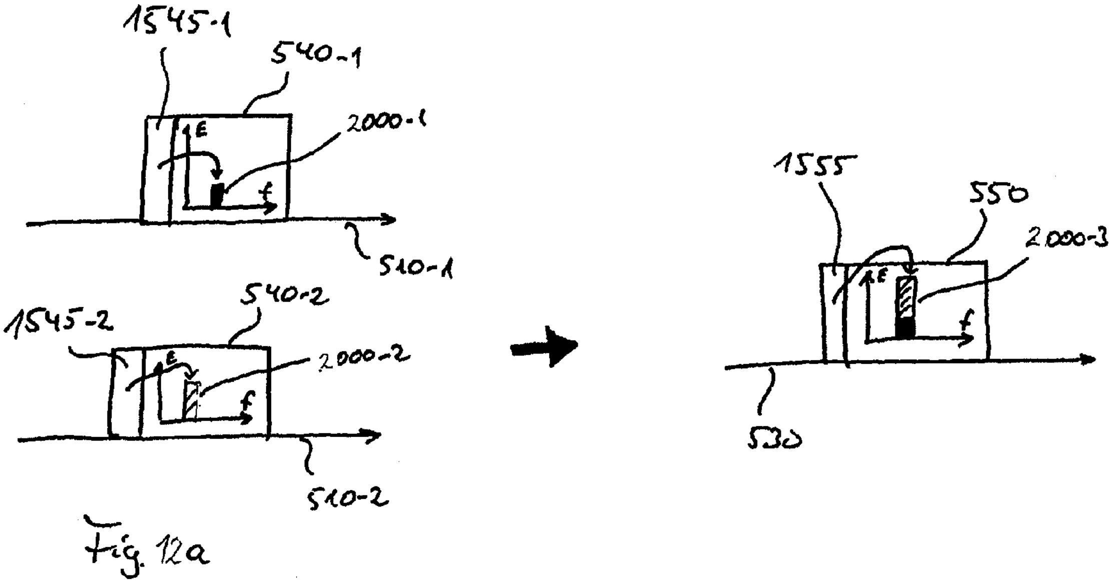
FIG. 12*a* illustrates an operation of an output data stream generation apparatus according to an embodiment of the present invention for a PNS-implementation.

FIG. 12*a* shows an example with a first and a second input data stream 510-1, 510-2, respectively, with appropriate input frames 540-1, 540-2 and respective control values 545-1, 545-2. As indicated by arrows in FIG. 11*a*, the control values 1545 of the frames 540 of the input data streams 510 indicate that a spectral component is not described in terms of spectral information indirectly, but in terms of an energy value of a noise source, or in other words, by an appropriate PNS-parameter. More specifically, FIG. 12*a* shows a first PNS-parameter 2000-1 and the frame 540-2 of the second input data stream 510-2 comprising a PNS-parameter 2000-2.

Since, as assumed with respect to FIG. 12*a*, the control values 1545 of the two frames 540 of the two input data streams 510 indicate that the specific spectral component is to be replaced by its respective PNS-parameter 2000, the processing unit 1520 and the apparatus 1500, as previously described, is capable of mixing the two PNS-parameters 2000-1, 2000-2 to arrive at a PNS-parameter 2000-3 of the output frame 550 to be included into the output data stream 530. The respective control value 1555 of the output frame 550 essentially also indicates that the respective spectral component is to be replaced by the mixed PNS-parameter 2000-3. This mixing process is illustrated in FIG. 12*a* by showing the PNS-parameter 2000-3 as being the combined PNS-parameters 2000-1, 2000-2 of the respective frames 540-1, 540-2.

However, the determination of the PNS-parameter 2000-3, which is also referred to a PNS-output parameter, may also be realized based on a linear combination according to $$PNS = \sum_{i=1}^{N} a_i \cdot PNS(i), \tag{6}$$

wherein PNS(i) is the respective PNS-parameter of input data stream i, N is the number of input data streams to be mixed and $a_i$ is an appropriate weighting factor. Depending on the concrete implementation, the weighting factors $a_i$ may be chosen to be equal $$a_1 = \ldots = a_N. \tag{7}$$

A straightforward implementation, which is illustrated in FIG. 12*a* may be that when all the weighting parameters $a_i$ are equal to 1, in other words, $$a_1 = \ldots = a_N = 1. \tag{8}$$

In case a normalizer 1590 as shown in FIG. 10 is to be omitted, the weighting factors may equally well be defined to be equal to 1/N so that the equation $$a_1 = \ldots = a_N = \frac{1}{N} \tag{9}$$

holds.

The parameter N here is the number of input data streams to be mixed, and the number of input data streams provided to the apparatus 1500, are a similar number. For the sake of simplicity, it should be noted that also different normalizations in terms of the weighting factors $a_i$ may be implemented.

In other words, in the case of an activated PNS tool on the participant side, the noise energy factor replaces an appropriate scale factor along with the quantized data in a spectral component (e.g. a spectral band). Apart from this factor, no further data will be provided into the output data stream by the PNS tool. In the case of mixing PNS-spectral components, it may come to two distinct cases.

As described above, when the respective spectral components of all frames 540 of the relevant input data streams are each expressed in terms of PNS-parameters. Since the frequency data of a PNS-related description of a frequency component (e.g. frequency band) are directly derived from the noise energy factor (PNS-parameter), the appropriate factors can be mixed by simply adding the respective values. The mixed PNS-parameter will then generate inside the PNS-decoder on the recipient side an equivalent frequency resolution to be mixed with the pure spectral values of other spectral components. In case a normalizing process is used during mixing, it might be helpful to implement a similar normalization factor in terms of the weighting factors $a_i$. For instance, when normalizing with a factor proportional to 1/N, the weighting factors $a_i$ may be chosen according to equation (9).

In case the control values 1545 of at least one input data stream 510 differs with respect to a spectral component, and if the respective input data streams are not to be discarded due to a low energy level, it might be advisable for the PNS decoder as shown in FIG. 11 to generate the spectral information or spectral data based on the PNS parameters and to mix the respective data in the framework of the spectral mixer 810 of the mixing unit instead of mixing PNS-parameters in the framework of the optimizing module 820.

Due to the independence of the PNS-spectral components with respect to each other, and with respect to globally defined parameters of the output data stream, as well as the input data streams, a selection of the mixing method may be adapted on a band-wise basis. In case such a PNS-based mixing is not possible, it might be advisable to consider re-encoding the respective spectral component by the PNS-encoder 1880 after mixing in the spectral domain.

Figure 12B:
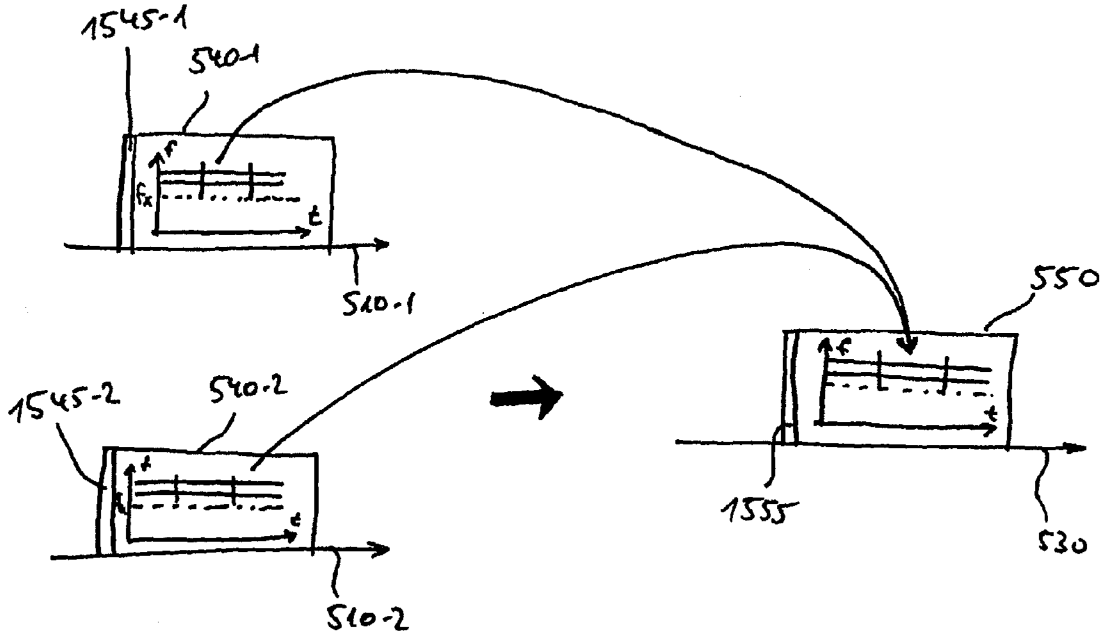
FIG. 12*b* illustrates an operation of an output data stream generation apparatus according to an embodiment of the present invention for a SBR-implementation.

FIG. 12*b* shows a further example of an operational principle of an embodiment according to an embodiment of the present invention. To be more precise, FIG. 12*b* shows the case of two input data streams 510-1, 510-2 with appropriate frames 540-1, 540-2 and their control values 1545-1, 1545-2. The frames 540 comprise SBR data for spectral components above a so-called cross-over frequency $f_x$. The control value 1545 comprises information as to whether SBR-parameters are used at all, and information concerning the actual frame grid or time/frequency grid.

As outlined above, the SBR tool replicates in an upper spectral band above the cross-over frequencies $f_x$ parts of the spectrum by replicating a lower part of a spectrum which is encoded differently. The SBR tool determines a number of time slots for each SBR frame which is equal to the frames 540 of the input data stream 510 comprising also further spectral information. The time-slots separate the frequency range of the SBR tool in small equally spaced frequency bands or spectral components. The number of these frequency bands in a SBR frame will be determined by the sender or the SBR tool prior to encoding. In case of an MPEG-4 AAC-ELD, the number of time-slots is fixed to be 16.

The time-slots are now included in so-called envelopes such that each envelope comprises at least two or more time-slots forming a respective group. Each envelope is attributed to a number of SBR frequency data. In the frame grid or time/frequency grid, the number and the length in units of time-slots of the individual envelopes is stored.

The frequency resolution of the individual envelopes determines how many SBR energy data are calculated for an envelope and stored with respect thereto. The SBR tool differs only between a high and a low resolution, wherein an envelope comprising a high resolution comprises twice as many values as an envelope with a low resolution. The number of frequency values or spectral components for envelopes comprising a high or low resolution depends on further parameters of the encoder such as bitrate, sampling frequency and so on.

In the context of MPEG-4 AAC ELD the SBR tool often utilizes 16 to 14 values with respect to the envelope which has a high resolution.

Due to the dynamic division of the frame 540 with an appropriate number of energy values with respect to frequency, a transient may be considered. In the case that a transient is present in a frame, the SBR encoder divides the respective frame in an appropriate number of envelopes. This distribution is standardized in the case of the SBR tool used with the AAC ELD codec and depends on the position of the transient transpose in units of the time-slot. In many cases, the resulting grid frame or time/frequency grid comprises three envelopes when a transient is present. A first envelope, the starting envelope, comprises the start of a frame up to the time slot receiving the transient having the time slot indices zero to transpose−1. The second envelope comprises a length of two time-slots enclosing the transient from the time-slot index transpose to transpose+2. The third envelope comprises all the remaining time-slots with the indices transpose+3 to 16.

However, the minimum length of an envelope is two time-slots. As a consequence, frames comprising a transient near the frame borders might eventually comprise only two envelopes. In case no transient is present in the frame, the time-slots are distributed over equally long envelopes.

FIG. 12*b* illustrates such a time/frequency grid or frame grid inside the frames 540. In case the control values 1545 indicate that the same SBR time grids or time/frequency grids are present in the two frames 540-1, 540-2, the respective SBR data may be copied similar to the method described in context with equations (6) to (9) above. In other words, in such a case the SBR mixing tool or the SBR mixer 830, as shown in FIG. 11, may copy the time/frequency grid or frame grid of the respective input frames to the output frame 550 and calculate the respective energy values similar to equations (6) to (9). In yet other words, the SBR energy data of the frame grid may be mixed by simply summing up the respective data and, optionally, by normalizing the respective data.

Figure 12C:
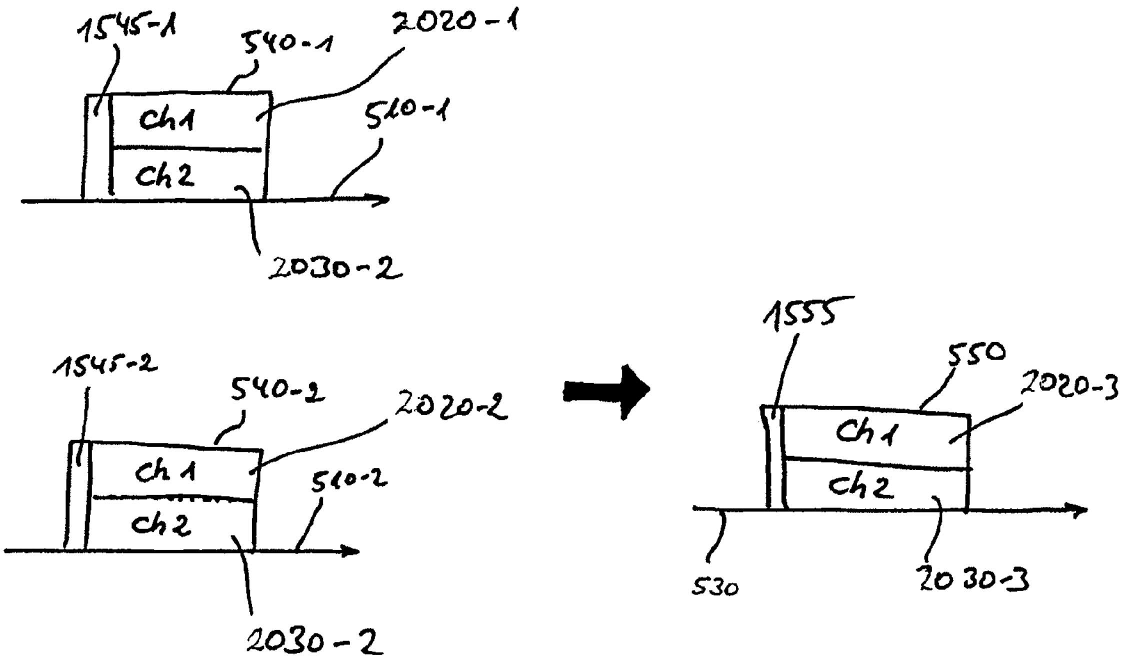
FIG. 12*c* illustrates an operation of an output data stream generation apparatus according to an embodiment of the present invention for an M/S-implementation.

FIG. 12*c* shows a further example of a mode of operation of an embodiment according to the present invention. To be more precise, FIG. 12*c* shows an M/S-implementation. Once again, FIG. 12*c* shows two input data streams 510 along with two frames 540 and associated control values 545 indicating a way the payload data frame 540 are represented, at least with respect to at least one spectral component thereof.

The frames 540 each comprise audio data or spectral information of two channels, a first channel 2020, and a second channel 2030. Depending on the control value 1545 of the respective frame 540, the first channel 2020 may be, for instance, a left channel or a mid-channel, while the second channel 2030 may be a right channel of a stereo signal, or a side channel. The first of the encoding modes is often referred to as a LR-mode, while the second mode is often referred to as M/S-mode.

In the M/S-mode, which is sometimes also referred to as a joint stereo, the mid-channel (M) is to be defined as being proportional to a sum of the left channel (L) and of the right channel (R). Often, an additional factor of ½ is included in the definition, such that the mid-channel comprises in both, the time-domain and the frequency-domain, an average value of the two stereo channels.

The side channel is typically defined to be proportional to a difference of the two stereo channels, namely, to be proportional to a difference of the left channel (L) and the right channel (R). Sometimes also an additional factor of ½ is included such that the side channel actually represents half the deviation value between the two channels of the stereo signal, or the deviation from the mid-channel. Accordingly, the left channel may be reconstructed by summing the mid-channel and the side channel, while the right channel may be obtained by subtracting the side channel from the mid-channel.

In case, for the frames 540-1 and 540-2 the same stereo encoding (L/R or M/S) is used, a retransformation of the channels comprised in the frame may be omitted allowing a direct mixing in the respective L/R- or M/S-encoded domain.

In this case, mixing can once again be carried out directly in the frequency domain leading to a frame 550 comprised in an output data stream 530 having the respective control value 1555 with a value equal to the control values 1545-1, 1545-2 of the two frames 540. The output frame 550 comprises, correspondingly, two channels 2020-3, 2030-3 derived from the first and second channels of the frames of the input data stream.

In case the control values 1545-1, 1545-2 of the two frames 540 are not equal, it might be advisable to transform one of the frames into the other representation based on the process described above. The control value 1555 of the output frame 550 may be set accordingly to the value indicative of the transformed frame.

According to embodiments of the present invention, it may be possible for the control values 1545, 1555 indicating a representation of the whole frame 540, 550, respectively, or the respective control values may be frequency component-specific. While in the first case, the channels 2020, 2030 are encoded over the whole frame by one of the specific methods, in the second case, in principle, each of the spectral information with respect to a spectral component may be differently encoded. Naturally, also subgroups of spectral components may be described by one of the control values 1545.

Additionally, a replacement algorithm may be performed in the framework of the psycho-acoustic module 950 to examine each of the pieces of spectral information concerning the underlying spectral components (e.g. frequency bands) of the resulting signal to identify spectral components with only a single active component. For these bands, the quantized values of the respective input data stream of input bit stream may be copied from the encoder without re-encoding or re-quantizing the respective spectral data for the specific spectral component. Under some circumstances all quantized data may be taken from a single active input signal to form the output bit stream or output data stream so that—in terms of the apparatus 1500—a lossless coding of the input data stream is achievable.

Furthermore, it may become possible to omit processing steps such as the psycho-acoustic analysis inside the encoder. This allows shortening the encoding process and, thereby, reducing the computational complexity since, in principle, only copying of data from one bit stream into another bit stream have to be performed under the certain circumstances.

For instance, in the case of PNS, a replacement can be carried out since noise factors of the PNS-coded band may be copied from one of the output data streams to the output data stream. Replacing individual spectral components with appropriate PNS-parameters is possible, since the PNS-parameters are spectral component-specific, or in other words, to a very good approximation independent from one another.

However, it may occur that a two aggressive application of the described algorithm may yield a degraded listening experience or an undesired reduction in quality. It may, hence, be advisable to limit replacement to individual frames, rather than spectral information, concerning individual spectral components. In such a mode of operation the irrelevance estimation or irrelevance determination, as well as replacement analysis may be carried out unchanged. However, a replacement may, in this mode of operation, only be carried out when all or at least a significant number of spectral components within the active frame are replaceable.

Although this might lead to a lesser number of replacements, an inner strength of the spectral information may in some situations be improved leading to an even slightly improved quality.

The embodiments outlined above may, naturally, differ with respect to their implementations. Although in the preceding embodiments, a Huffman decoding and encoding has been described as a single entropy encoding scheme, also other entropy encoding schemes may be used. Moreover, implementing an entropy encoder or an entropy decoder is by far not essential. Accordingly, although the description of the previous embodiments have focused mainly on the ACC-ELD codec, also other codecs may be used for providing the input data streams and for decoding the output data stream on the participant side. For instance, any codec being based on, for instance, a single window without block length switching may be employed.

As the preceding description of the embodiments shown in FIGS. 8 and 11, for example, has also shown, the modules described therein are not mandatory. For instance, an apparatus according to an embodiment of the present invention may simply be realized by operating on the spectral information of the frames.

It should be noted that the embodiments described above with respect to FIG. 6 to 12C may be realized in very different ways. For instance, an apparatus 500/1500 for mixing a plurality of input data streams and its processing unit 520/1520 may be realized on the basis of discrete electrical and electronic devices such as resistors, transistors, inductors, and the like. Furthermore, embodiments according to the present invention may also be realized based on integrated circuits only, for instance in the form of SOCs (SOC=system on chip), processors such as CPUs (CPU=central processing unit), GPU (CPU=graphic processing unit), and other integrated circuits (IC) such as application specific integrated circuits (ASIC).

It should also be noted that electrical devices being part of the discrete implementation or being part of an integrated circuit may be used for different purposes and different functions throughout implementing an apparatus according to an embodiment of the present invention. Naturally, also a combination of circuits based on integrated circuits and discrete circuits may be used to implement an embodiment according to the present invention.

Based on a processor, embodiments according to the present invention may also be implemented based on a computer program, a software program, or a program which is executed on a processor.

In other words, depending on certain implementation requirements of embodiments of inventive methods, embodiments of the inventive methods may be implemented in hardware or in software. The implementation can be performed using a digital storage medium, in particular a disc, a CD or a DVD having electronically readable signals stored thereon which cooperate with a programmable computer or processor such that an embodiment of the inventive method is performed. Generally, an embodiment of the present invention is, therefore, a computer program product with a program code stored on a machine-readable carrier, the program code being operative to perform an embodiment of the inventive method when the computer program product runs on a computer or processor. In yet other words, embodiments of the inventive methods are, therefore, a computer program having a program code for performing at least one of the embodiments of the inventive methods, when the computer program runs on a computer or processor. A processor can be formed by a computer, a chip card, a smart card, an application-specific integrated circuit, a system on chip (SOC), or an integrated circuit (IC).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for mixing a plurality of input data streams, wherein the input data streams each comprise a frame of audio data in a spectral domain, a frame of an input data stream comprising spectral information for a plurality of spectral components, the apparatus comprising:

a processing unit adapted to compare the frames of the plurality of input data streams, wherein the processing unit is further adapted to determine, based on the comparison, for a spectral component of an output frame of an output data stream, exactly one input data stream of the plurality of input data streams; and wherein the processing unit is further adapted to generate the output data stream by copying at least a part of information of a corresponding spectral component of the frame of the determined input data stream to describe the spectral component of the output frame of the output data stream.

2. The apparatus according to claim 1, wherein the processing unit is adapted to compare the frames of the plurality of input data streams based on a psycho-acoustic model.

3. The apparatus according to claim 1, wherein the processing unit is adapted such that comparing the frames of the plurality of input data streams is based on at least two pieces of spectral information corresponding to the same spectral component of frames of two different input data streams.

4. The apparatus according to claim 1, wherein the apparatus is adapted such that a spectral component of a plurality of spectral components corresponds to a frequency or a frequency band.

5. The apparatus according to claim 1, wherein the processing unit is adapted such that generating the output data stream comprises copying the at least part of the information of the corresponding spectral component only from the frame of the determined input data stream to describe the spectral component of the output frame of the output data stream.

6. The apparatus according to claim 1, wherein the processing unit is adapted such that generating the output data stream comprises copying audio data in the spectral domain corresponding to the spectral component from the frame of the determined input data stream.

7. The apparatus according to claim 1, wherein the input data streams of the plurality of input data streams comprise, with respect to time, each a sequence of frames of audio data in the spectral domain, and wherein the processing unit is adapted such that comparing the frames is based on frames only corresponding to a common time index of the sequence of frames.

8. The apparatus according to claim 1, wherein the processing unit is adapted such that generating the output data stream maintains a distribution of quantization levels compared to a distribution of quantization levels of the at least part of the information of the corresponding spectral component of the frame of the determined input stream.

9. The apparatus according to claim 1, wherein the at least part of the information of the corresponding spectral component comprises information concerning quantization levels, a perceptual noise substitution parameter, a temporal noise substitution parameter or a spectral band replication parameter.

10. A method for mixing a plurality of input data streams, wherein the input data streams each comprise a frame of audio data in a spectral domain, a frame of an input data stream comprising a plurality of spectral components, the method comprising:

comparing the frames of the plurality of input data streams;

determining, based on the comparison, for a spectral component of an output frame of an output data stream exactly one input data stream of the plurality of input data streams; and generating the output data stream by copying at least a part of a piece of information of a corresponding spectral component of the frame of the determined input data stream to describe the spectral component of the frame of the output data stream.

11. A computer program for performing, when running on a processor, a method for mixing a plurality of input data streams, wherein the input data streams each comprise a frame of audio data in a spectral domain, a frame of an input data stream comprising a plurality of spectral components, the method comprising:

comparing the frames of the plurality of input data streams;

determining, based on the comparison, for a spectral component of an output frame of an output data stream exactly one input data stream of the plurality of input data streams; and generating the output data stream by copying at least a part of a piece of information of a corresponding spectral component of the frame of the determined input data stream to describe the spectral component of the frame of the output data stream.

12. An apparatus for generating an output data stream from a first input data stream and a second input data stream, wherein the first and second input data streams each comprise a frame, wherein the frames each comprise a control value and associated payload data, the control value indicating a way the payload data represents at least a part of a spectral domain of an audio signal, comprising:

a processor unit adapted to compare the control value of the frame of the first input data stream and the control value of the frame of the second input data stream to yield a comparison result, wherein the processor unit is further adapted to, if the comparison result indicates that the control values of the frames of the first and second input data streams are identical, generate the output data stream comprising an output frame such that the output frame comprises a control value equal to that of the frame of the first and second input data streams and payload data derived from the payload data of the frames of the first and second input data streams by processing the audio data in the spectral domain.

13. The apparatus according to claim 12, wherein the processing unit is adapted such that control value of the frame of the first or second input data streams relate to at least one spectral component only and wherein the payload data associated with the control value represent a description of the audio signal with respect to the at least one spectral component.

14. The apparatus according to claim 13, wherein the processing unit is adapted such that the control value of the frame of the first input data stream and the control value of the frame of the second input data stream and the associated payload data of the frames of the first and second input data streams relate to the same spectral component.

15. The apparatus according to claim 12, wherein the processing unit is adapted such that the first input data stream and the second input data stream each comprise a sequence of frames with respect to time, and wherein the processor unit is adapted to compare the control values of the frames of the first and the second input data streams for frames associated with a common time index of the frames with respect to the sequence of frames.

16. The apparatus according to claim 12, wherein the processor unit is further adapted to transform the payload data of the frame of one of the first and the second input data streams to a representation of the payload data of the frame of the other of the first and second input data streams, when the comparison result indicates that the control values of the first and second input data streams are not identical, before generating the output frame comprising a control value equal to that of the frame of the other of the first and the second input data streams and payload data derived from the payload data of the frames of the one input data stream and the transformed representation of the other input data stream by processing the audio data in the spectral domain.

17. The apparatus according to claim 12, wherein the processor unit is adapted to generate the output frame such that a distribution of quantization levels is maintained with respect to at least a part of at least one of the frames of the first and second input data streams.

18. The apparatus according to claim 17, wherein the part of the at least one frame corresponds to a spectral component only, to which the control value and the payload data associated with the control value relate to.

19. The apparatus according to claim 12, wherein the processing unit is adapted such that the payload data of the frame of a first input data stream and the payload data of the frame of a second input data stream each comprise a representation of first audio channel and a second audio channel of the audio signal in the spectral domain, and wherein the control value of the frame of the first input data stream and the control value of the frame of the second input data stream indicate as to whether the first channel is a left channel (L-channel) and the second channel is a right channel (R-channel) of the audio signal or whether the first channel is a mid channel (M-channel) and the second channel is a side channel (S-channel) of the audio signal.

20. The apparatus according to claim 12, wherein the processing unit is adapted such that the control values of the frames of the first and the second input data streams indicate as to whether the payload data associated with the respective control values comprise an energy-related value of a noise source.

21. The apparatus according to claim 20, wherein the energy-related value is a perceptual noise substitution parameter (PNS parameter).

22. The apparatus according to claim 12, wherein the processing unit is adapted such that the control value of the frame of the first input data stream and the control value of the frame of the second input data stream comprises information concerning an envelope of SBR data comprised in the payload data associated with said control value, and wherein the processor unit is adapted to generate the output data stream in a SBR spectral domain, when the comparison result indicates identical envelopes.

23. The apparatus according to claim 12, wherein the processor unit is further adapted to compare the frames of the first and second input data stream, wherein the processor unit is further adapted to determine, based on the comparison of the frames, exactly one input data stream of the first and second input data streams, and wherein the processor unit is further adapted to generate the output data stream by copying the payload data and the control value of the frame of the determined input stream.

24. The apparatus according to claim 12, wherein the apparatus is adapted to processing a plurality of input data streams comprising more than two input data stream, the plurality of input data streams comprising the first and second input data streams.

25. The apparatus according to claim 12, wherein the processor unit is further adapted to generate the output data stream by deriving the payload data of the output data stream from the payload data of the frames of the first and second input data streams by remaining within the way of representation of the spectral domain, as indicated by the control values.

26. A method for generating an output data stream from a first input data stream and a second input data stream, wherein the first and second input data streams each comprise a frame, wherein the frame comprises the control value and associated payload data, the control value indicating a way the payload data represents at least a part of a spectral domain of an audio signal, comprising:

comparing the control value of the frame of the first input data stream and the control value of the frame of the second input data stream to yield a comparison result; and if the comparison result indicates that the control values of the frames of the first and second input data streams are identical, generating the output data stream comprising an output frame, such that the output frame comprises a control value equal to that of the frame of the first and second input data streams and payload data derived from the payload data of the frames of the first and second input data streams by processing the audio data in the spectral domain.

27. A program for performing, when running on a processor, a method for generating an output data stream from a first input data stream and a second input data stream, wherein the first and second input data streams each comprise a frame, wherein the frame comprises the control value and associated payload data, the control value indicating a way the payload data represents at least a part of a spectral domain of an audio signal, comprising:

comparing the control value of the frame of the first input data stream and the control value of the frame of the second input data stream to yield a comparison result; and if the comparison result indicates that the control values of the frames of the first and second input data streams are identical, generating the output data stream comprising an output frame, such that the output frame comprises a control value equal to that of the frame of the first and second input data streams and payload data derived from the payload data of the frames of the first and second input data streams by processing the audio data in the spectral domain.

* * * * *